United States Patent
Kloosterman et al.

(10) Patent No.: US 8,226,912 B2
(45) Date of Patent: Jul. 24, 2012

(54) METHOD OF TREATING A GASEOUS MIXTURE COMPRISING HYDROGEN, CARBON DIOXIDE AND HYDROGEN SULPHIDE

(75) Inventors: Jeffrey William Kloosterman, Allentown, PA (US); Kevin Boyle Fogash, Wescosville, PA (US); Andrew David Wright, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 136 days.

(21) Appl. No.: 12/835,063

(22) Filed: Jul. 13, 2010

(65) Prior Publication Data

US 2012/0014851 A1  Jan. 19, 2012

(51) Int. Cl.
*C01B 3/02* (2006.01)
*C01B 31/20* (2006.01)
*C10L 3/00* (2006.01)

(52) U.S. Cl. ........ 423/210; 423/224; 423/245.3; 423/235; 423/243.01; 423/437.1; 423/648.1; 252/373

(58) Field of Classification Search .......... 423/210, 423/224, 245.3, 235, 243.01, 437.1, 648.1; 252/373
See application file for complete search history.

(56) References Cited

U.S. PATENT DOCUMENTS

2007/0178035 A1  8/2007 White et al.
2010/0011955 A1  1/2010 Hufton et al.
2012/0014851 A1*  1/2012 Kloosterman et al. ........ 423/210

FOREIGN PATENT DOCUMENTS

| EP | 0 204 478 A2 | 12/1986 |
| EP | 0262984 | 3/1992 |
| EP | 1 816 103 A2 | 8/2007 |

OTHER PUBLICATIONS

Wright et al; "Separation of a Sour Syngas Stream;" U.S. Appl. No. 12/835,112, filed Jul. 13, 2010.
Wright et al; "Method and Apparatus for Producing Power and Hydrogen;" U.S. Appl. No. 12/835,084, filed Jul. 13, 2010.

* cited by examiner

*Primary Examiner* — Timothy Vanoy
(74) *Attorney, Agent, or Firm* — Willard Jones, II

(57) ABSTRACT

A gaseous mixture, comprising $CO_2$, $H_2$, $H_2S$ and optionally CO, is separated into an $H_2$ or $H_2$ and CO product stream ($H_2$/CO product stream), and a $CO_2$ enriched stream containing at least one combustible component selected from $H_2S$, $H_2$, CO and any additional combustible components present in the gaseous mixture. A support fuel stream, comprising one or more combustible components, is combusted to form a stable flame, and the $CO_2$ enriched stream and flame are contacted in the presence of sufficient $O_2$ to combust all or substantially all of the combustible component(s) present in said $CO_2$ enriched stream. A $CO_2$ product stream is formed from said combustion effluent. The support fuel stream may be generated from the process of generating or separating the gaseous mixture or from the $H_2$/CO product stream. Where the $CO_2$ enriched stream contains $H_2S$, the support fuel stream may also be a stream obtained off-site that comprises $H_2S$.

27 Claims, 4 Drawing Sheets

METHOD OF TREATING A GASEOUS MIXTURE COMPRISING HYDROGEN, CARBON DIOXIDE AND HYDROGEN SULPHIDE

BACKGROUND OF THE INVENTION

The present invention relates to a method of treating a gaseous mixture comprising carbon dioxide ($CO_2$), hydrogen ($H_2$), hydrogen sulphide ($H_2S$), optionally carbon monoxide (CO), and optionally one or more additional combustible components, to obtain an $H_2$/CO product stream and a $CO_2$ product stream. The invention has particular application in the treatment of a syngas mixture, such as obtained from reforming or gasifying a carbonaceous feedstock, to obtain: an $H_2$/CO product stream, for example an $H_2$ stream or syngas ($H_2$ and CO) of suitable purity for use in chemicals production, a refinery, or power production; and a $CO_2$ product stream that is of suitable purity for geological storage or use in enhanced oil recovery (EOR).

The production of syngas mixtures via reforming gaseous or liquid feedstock or via the gasification of solid or liquid feedstock is well known, and has been a topic of research and development for decades. Such processes result in a crude syngas stream which, in addition to $H_2$ and CO, also contains $CO_2$ and other impurities. The gasification of solid and liquid feedstock, for example, typically results in an initial syngas mixture that can include a variety of impurities, such as but not limited to: particulates (which are typically removed in the slag of the gasifier, and/or are removed from the crude syngas mixture in an initial quenching step using water); $CO_2$; CO (which can be considered an impurity if the intention is to obtain a high purity $H_2$ stream, as opposed to a high purity syngas); $CH_4$; $H_2S$; carbonyl sulphide (COS); carbon disulphide ($CS_2$); ammonia ($NH_3$); nitrogen ($N_2$); and argon (Ar).

$CO_2$ and CO arise as oxidation products of the feedstock during gasification. $H_2S$, and to a lesser extent other sulphur containing species such as COS and $CS_2$, are usually also present in the crude syngas obtained from gasification of solid or heavy liquid feedstock, and arise from the reduction of sulphur present in the feedstock during gasification. The crude syngas mixture is often also subjected to a water-gas shift reaction to convert by reaction with $H_2O$ some or all of CO in the syngas to $CO_2$ and $H_2$, especially where the objective is to produce a high purity $H_2$ stream rather than high purity syngas stream. This can have the incidental effect of also increasing the concentration of $H_2S$ in the resulting shifted sygnas mixture, due to further conversion of other sulphur species in the crude syngas stream to $H_2S$ during the water-gas shift reaction.

An array of syngas clean up technologies can be found in the art. Due to concerns over greenhouse gas emissions there is a growing desire to remove $CO_2$ from hydrogen or syngas prior to their use as fuel, and $H_2$ or syngas for chemicals production must meet even more stringent purity specifications. In a $CO_2$ capture process the removed $CO_2$ would typically be compressed so as to be stored underground or used in EOR. $H_2S$ must, where present, also be separated from the $H_2$ or syngas, as if the $H_2$ or syngas is to be used as a fuel then the presence of $H_2S$ will result in $SO_x$ ($SO_2$ and $SO_3$) in the combustion effluent (on which there may also stringent emissions limits), and if the $H_2$ or syngas is to be used in a chemicals plant or refinery then $H_2S$ could be a poison for processes within the plant or refinery. It may not be practical or permissible to store the $H_2S$ with the $CO_2$, and therefore removal of $H_2S$ from $CO_2$ may likewise be required.

$CO_2$ and $H_2S$ are often removed using a liquid solvent process (e.g. Selexol™, Rectisol®, or other such acid gas removal process). Here, a liquid solvent (for example methanol in the case of the Rectisol® process) is used to absorb and remove $CO_2$ and $H_2S$ from the crude syngas, producing a purified syngas stream, a bulk $CO_2$ stream and an $H_2S$ laden stream. The $CO_2$ stream can be vented or directly pressurized and piped to storage or used for enhanced oil recovery (EOR), and the $H_2S$ laden stream (typically 10-80 mol %, more typically >20 mol % and usually preferably >40 mol % $H_2S$) is sent to a Claus process for the production of elemental sulfur. In the Claus process $H_2S$ is partially combusted to form an $H_2S$ and $SO_2$ mixture which can then undergo the Claus reaction to form elemental sulfur and a tailgas stream containing $CO_2$, unreacted $H_2S$ and $SO_2$, and other minor components. However, the aforementioned liquid solvent processes are both costly and have significant power consumption. This is especially true when the incoming $H_2S$ stream is dilute, e.g. <40%, as equipment sizes become large in order to accommodate the increase in $H_2S$ stream inerts.

An alternative approach that has been developed utilizes an adsorption based process, pressure swing adsorption, to purify syngas streams containing $CO_2$ and at least one additional combustible component, such as $H_2S$. In this process a $CO_2$ rich stream with combustibles is formed which is then combusted, to produce a crude $CO_2$ stream with combustion products that can then be removed using existing technologies to produce a $CO_2$ stream of adequate purity for geological storage or EOR.

In particular, US-A1-2007/0178035, the disclosure of which is incorporated herein by reference, describes a method of treating a gaseous mixture comprising $H_2$, $CO_2$ and at least one combustible gas selected from $H_2S$, CO and $CH_4$, such as a gaseous mixture arising from gasification of carbonaceous fuel, hydrocarbonaceous fuel or biomass fuel. $H_2$ is separated from the gaseous mixture, preferably by a pressure swing adsorption (PSA) process, to produce a separated $H_2$ gas and a crude $CO_2$ gas comprising the combustible gas(es). The crude $CO_2$ gas is then combusted (preferably in an oxyfuel combustion process) in the presence of $O_2$ to produce heat and a $CO_2$ product gas comprising combustion products of the combustible gas(es), these combustion products being $CO_2$ in the case of CO; $CO_2$ and $H_2O$ in the case of $CH_4$; and $SO_x$ ($SO_2$ and $SO_3$) and $H_2O$ in the case of $H_2S$. Some $H_2$ may also be present in the crude $CO_2$ gas, which provides $H_2O$ as a combustion product. An additional carbonaceous fuel, hydrocarbonaceous fuel, or biomass fuel may also be combusted in the combustion process, the combustion of pulverized coal being given as an example. Where combustion products include $SO_2$ and $SO_3$, the $CO_2$ product gas can be washed with water, to cool the gas and remove $SO_3$, and maintained at elevated pressure in the presence of $O_2$, water and $NO_x$ (NO and $NO_2$) to convert $SO_2$ and $NO_x$ to sulfuric acid and nitric acid. The acids and water may then be separated from the $CO_2$ product.

Likewise, EP-A2-0262894, the disclosure of which is also incorporated herein by reference, describes a process for co-production of enriched streams of separate $CO_2$ and $H_2$ products from, for example, the effluent from a steam methane reformer. A PSA unit is used for the separation producing a primary stream of enriched hydrogen which may be liquefied. The purge stream from the PSA unit, comprising $CO_2$ and combustible gases including CO, $CH_4$ and $H_2$, is combusted in the presence of pure or enriched oxygen in an internal combustion engine, gas turbine or other such combustion device to generate power and provide a stream consisting essentially of $CO_2$ and water. This stream can then be cooled to condense out the water vapor, providing essentially pure $CO_2$ that can be liquified.

Such processes, in addition to providing high purity $H_2$ and $CO_2$ streams, have the benefit of concurrently producing heat and/or power that can be put to use. However, the present inventors have found that, in some cases, separation of a sour (i.e. $H_2S$ containing) syngas mixture by PSA or other means will result in a separated $CO_2$ stream that may be too dilute in combustible components to constitute a stream that, on its own and under the operating conditions under which combustion is to take place, can be combusted to form a stable flame. This may, in turn, compromise proper operation of the process, as flame instability will result in failure to stably combust the combustible components of the $CO_2$ stream, which may result in said components remaining as contaminants in what would otherwise be the desired high purity $CO_2$ product.

A generally known means of stabilizing combustion of a waste stream that would, otherwise, not be stably combusted is to combust also a support fuel of the type available for purchase on a futures basis (NYMEX, etc.), such as natural gas or light oils. However, the use of such traditional support fuels will increase the operational cost of the process in which they are employed.

There therefore remains a need for cost effective and reliable methods of treating a gaseous mixture, that comprises carbon dioxide ($CO_2$), hydrogen ($H_2$), hydrogen sulphide ($H_2S$), optionally carbon monoxide (CO), and optionally one or more additional combustible components.

BRIEF SUMMARY OF THE INVENTION

According to the present invention, there is in one aspect provided a method of treating a gaseous mixture comprising $CO_2$, $H_2$, $H_2S$, optionally CO, and optionally one or more additional combustible components, to obtain an $H_2$ or $H_2$ and CO product stream ($H_2$/CO product stream) and a $CO_2$ product stream, the method comprising:

separating the gaseous mixture to provide the $H_2$/CO product stream and a $CO_2$ enriched stream, the $CO_2$ enriched stream containing at least one combustible component selected from $H_2S$, $H_2$, CO and any additional combustible components present in the gaseous mixture;

obtaining a support fuel stream comprising one or more combustible components, wherein said support fuel stream is a gaseous stream derived from the production of the gaseous mixture, is a portion of the gaseous mixture, is separated from the gaseous mixture in addition to the $H_2$/CO product stream and $CO_2$ enriched stream, is a portion of the $H_2$/CO product, or is derived from the $H_2$/CO product;

combusting the support fuel stream, in the presence of sufficient $O_2$ to combust all or substantially all of the combustible component(s) present in said support fuel stream, to form a stable flame to act as the ignition source for combustion of the combustible component(s) present in the $CO_2$ enriched stream;

contacting the $CO_2$ enriched stream, said flame and sufficient $O_2$ to combust all or substantially all of the combustible component(s) present in said $CO_2$ enriched stream and form a combustion effluent comprising $CO_2$ and the combustion product(s) of the combustible component(s) of the support fuel and $CO_2$ enriched streams; and forming the $CO_2$ product stream from said combustion effluent.

According to the present invention, there is in another aspect provided a method of treating a gaseous mixture, comprising $CO_2$, $H_2$, $H_2S$, optionally CO, and optionally one or more additional combustible components, to obtain an $H_2$ or $H_2$ and CO product stream ($H_2$/CO product stream) and a $CO_2$ product stream, the method comprising:

separating the gaseous mixture to provide the $H_2$/CO product stream and a $CO_2$ enriched stream, the $CO_2$ enriched stream containing $H_2S$ and, optionally, one or more other combustible components selected from $H_2$, CO and any additional combustible components present in the gaseous mixture;

obtaining a support fuel stream comprising $H_2S$ and, optionally, one or more other combustible components, wherein the support fuel stream contains at least 50 ppm $H_2S$;

combusting the support fuel stream, in the presence of sufficient $O_2$ to combust all or substantially all of the combustible component(s) present in said support fuel stream, to form a stable flame to act as the ignition source for combustion of the combustible component(s) present in the $CO_2$ enriched stream;

contacting the $CO_2$ enriched stream, said flame and sufficient $O_2$ to combust all or substantially all of the combustible component(s) present in said $CO_2$ enriched stream and form a combustion effluent comprising $CO_2$, $SO_x$, $H_2O$ and any other combustion product(s) of any other combustible component(s) additional to $H_2S$ present in the support fuel and $CO_2$ enriched streams; and removing $SO_x$ and $H_2O$ from the combustion effluent so as to form the $CO_2$ product stream from said combustion effluent.

DETAILED DESCRIPTION OF THE INVENTION

Figure 1:
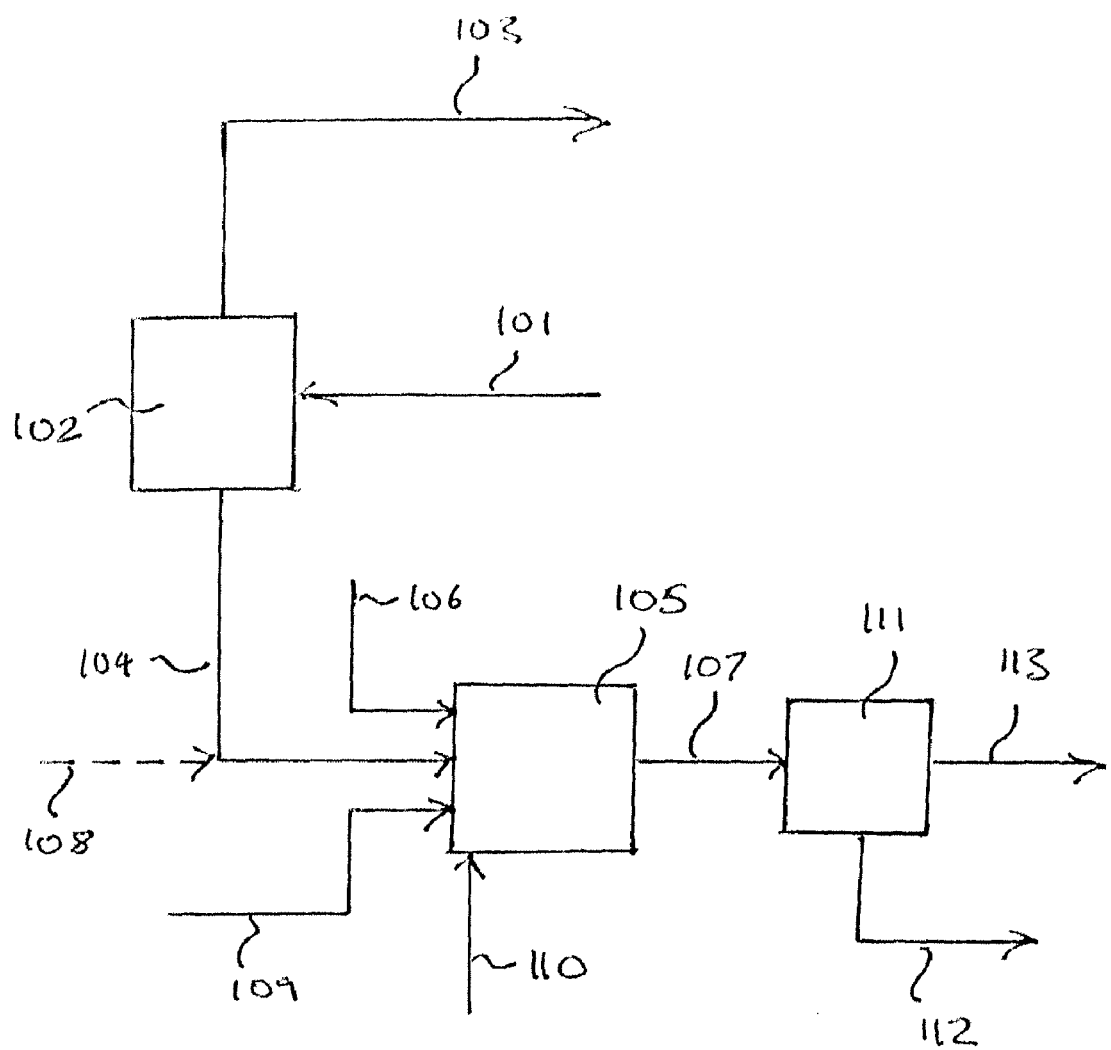
FIG. 1 is a flow sheet depicting an embodiment of the present invention.

The present invention provides methods for treating a gaseous mixture, comprising $CO_2$, $H_2$, $H_2S$, optionally CO, and optionally one or more additional combustible components, to obtain an $H_2$/CO product stream and a $CO_2$ product stream.

According to a first aspect of the invention, the method comprises:

separating the gaseous mixture to provide the $H_2$/CO product stream and a $CO_2$ enriched stream, the $CO_2$ enriched stream containing at least one combustible component selected from $H_2S$, $H_2$, CO and any additional combustible components present in the gaseous mixture;

obtaining a support fuel stream comprising one or more combustible components, wherein said support fuel stream is a gaseous stream derived from the production of the gaseous mixture, is a portion of the gaseous mixture, is separated from the gaseous mixture in addition to the $H_2$/CO product stream and $CO_2$ enriched stream, is a portion of the $H_2$/CO product, or is derived from the $H_2$/CO product;

combusting the support fuel stream, in the presence of sufficient $O_2$ to combust all or substantially all of the combustible component(s) present in said support fuel stream, to form a stable flame to act as the ignition source for combustion of the combustible component(s) present in the $CO_2$ enriched stream;

contacting the $CO_2$ enriched stream, said flame and sufficient $O_2$ to combust all or substantially all of the combustible component(s) present in said $CO_2$ enriched stream and form a combustion effluent comprising $CO_2$ and the combustion product(s) of the combustible component(s) of the support fuel and $CO_2$ enriched streams; and forming the $CO_2$ product stream from said combustion effluent.

According to a second aspect of the invention, the method comprises:

separating the gaseous mixture to provide the $H_2$/CO product stream and a $CO_2$ enriched stream, the $CO_2$ enriched stream containing $H_2S$ and, optionally, one or more other combustible components selected from $H_2$, CO and any additional combustible components present in the gaseous mixture;

obtaining a support fuel stream comprising $H_2S$ and, optionally, one or more other combustible components, wherein the support fuel stream contains at least 50 ppm $H_2S$;

combusting the support fuel stream, in the presence of sufficient $O_2$ to combust all or substantially all of the combustible component(s) present in said support fuel stream, to form a stable flame to act as the ignition source for combustion of the combustible component(s) present in the $CO_2$ enriched stream;

contacting the $CO_2$ enriched stream, said flame and sufficient $O_2$ to combust all or substantially all of the combustible component(s) present in said $CO_2$ enriched stream and form a combustion effluent comprising $CO_2$, $SO_x$, $H_2O$ and any other combustion product(s) of any other combustible component(s) additional to $H_2S$ present in the support fuel and $CO_2$ enriched streams; and removing $SO_x$ and $H_2O$ from the combustion effluent so as to form the $CO_2$ product stream from said combustion effluent.

The methods according to the invention therefore provide for stable combustion of all or substantially all of the combustible components contained in the $CO_2$ enriched stream, by combusting a support fuel stream to provide a stable flame which then acts as a stable ignition source for combustion of said combustible components in the $CO_2$ enriched stream. However, the methods according to the invention do not use as a support fuel stream a traditional support fuel (i.e. a support fuel of the type available for purchase on a futures basis, such as natural gas or light oils) purchased or obtained from off-site.

Rather, according to the first aspect of the invention, a support fuel stream is used which is a gaseous stream derived from the production of the gaseous mixture, is a portion of the gaseous mixture, is separated from the gaseous mixture in addition to the $H_2$/CO product stream and $CO_2$ enriched stream, is a portion of the $H_2$/CO product, or is derived from the $H_2$/CO product, and thus which is obtained on-site. According to the second aspect of the invention, a support fuel stream is used which (unlike traditional support fuels) has an $H_2S$ content of 50 ppm or above, which $H_2S$ would usually be undesirable in a support fuel but which in the method according to the second aspect can be removed alongside and in the same way as the $H_2S$ already present in the $CO_2$ enriched stream.

As such, the methods according to the present invention address the need for cost effective and reliable methods of treating sour syngas mixtures and other such gaseous mixtures, comprising at least $H_2$, $CO_2$ and $H_2S$, by providing stable combustion of the combustible components of the separated $CO_2$ enriched stream via combustion of a support fuel stream that is obtained on-site or which may be obtained off-site but which (due to its $H_2S$ content) is nevertheless of lower cost than a traditional support fuel. Where the support fuel stream is a $CO_2$ containing stream or stream containing carbonaceous combustible components (e.g. CO, hydrocarbons) and would otherwise have been vented, the combustion of the support fuel stream in accordance with the present invention has the additional benefit of increasing the overall $CO_2$ capture of the process, by incorporating the $CO_2$ (whether originally present or obtained as a combustion product of the combustible components) with the $CO_2$ from the $CO_2$ enriched stream in a $CO_2$ product stream that is suitable for geological storage or EOR, or that can be further purified to obtain a stream suitable for geological storage or EOR.

The gaseous mixture is preferably a gaseous mixture obtained from gasifying or reforming a carbonaceous feedstock. The mixture may be a crude syngas obtained directly from the gasifier/reformer, or it may have been subjected to further treatment. For example, the crude syngas may have been: processed to remove particulates (e.g. in a quenching or radiant cooling step); subjected to a water-gas shift reaction to convert some or all of the CO present in the crude syngas to $CO_2$ and $H_2O$; and/or processed to remove some or all of any water present.

The gaseous mixture preferably comprises (on a dry basis): from about 10 to about 60 mole %, more preferably from about 15 to about 45 mole % $CO_2$; from about 500 ppm (0.05 mole %) to about 5 mole %, more preferably from about 2000 ppm (0.2 mole %) to about 2 mole % $H_2S$ (or $H_2S$ and any other sulphur containing components); and from about 35 mole % up to the remainder, more preferably from about 50 mole % up to the remainder of $H_2$ or, if CO is present, of a mixture of $H_2$ and CO. The mixture may, for example, be a crude or processed sour (i.e. $H_2S$ containing) syngas. Other components of the gaseous mixture that may, for example, be present include $CH_4$, $N_2$, Ar, and sulphur containing components (e.g. COS, $CS_2$) additional to $H_2S$.

The $H_2$/CO product stream is enriched in $H_2$ relative to the gaseous mixture, and is depleted in $CO_2$ and $H_2S$ (and, preferably, any other sulphur containing components) relative to the gaseous mixture. Where CO is present in the gaseous mixture, the $H_2$/CO product stream may be enriched in $H_2$ and CO relative to the gaseous mixture (for example where the desire is to obtain a purified syngas stream) or may be enriched in $H_2$ only (for example where the desire is to obtain a purified $H_2$ stream). Preferably, the $H_2$/CO product stream is at least about 90 mole % $H_2$ or a mixture of $H_2$ and CO, and contains less than about 50 ppm, more preferably less than about 10 ppm, and most preferably less than 3 ppm $H_2S$. Where the desired use of the $H_2$/CO product stream is as a fuel for power production, the product is preferably at least 90 mole % $H_2$. Where the desired $H_2$/CO product stream is a high purity $H_2$ product for use in a chemicals plant or refinery, the product is preferably at least 99.9 mole % $H_2$. Where the desired $H_2$/CO product stream is a syngas ($H_2$/CO mixture) for use in a chemicals plant (e.g. Fischer-Tropsch plant), the product is preferably at least at least 90 mole %, and more preferably 95 mole % a mixture of $H_2$ and CO, with a CO:$H_2$ ratio preferably between about 1:3 and about 3:1, and more preferably from about 1:1 to about 1:2.5.

The $CO_2$ enriched stream contains at least one combustible component selected from $H_2S$, $H_2$, CO and any additional combustible components present in the gaseous mixture (for example, $CH_4$, $CS_2$ and/or COS, as and where present). The $CO_2$ enriched stream is enriched in $CO_2$ and depleted in $H_2$ relative to the gaseous mixture. However, typically (and in particular where the $CO_2$ enriched stream has been obtained using pressure swing adsorption, via which complete separation of all $H_2$ from all $CO_2$ present in a mixture is not normally economically viable) the $CO_2$ enriched stream will contain some $H_2$. The $CO_2$ enriched stream will typically also be enriched in $H_2S$ (and, preferably, any other sulphur containing components) relative to the gaseous mixture, unless the support fuel stream is obtained by being separated from the gaseous mixture in addition to the $H_2$/CO product stream and $CO_2$ enriched stream, in which case the support fuel stream may recover some or all of the $H_2S$ (and, optionally, any other sulphur containing components) from the gaseous mixture, such that the $CO_2$ enriched mixture may or may not then be enriched or depleted in $H_2S$ (and, optionally, any other sulphur containing components) relative to the gaseous mixture. Where CO is present in the gaseous mixture, the $CO_2$ enriched stream will typically contain some CO, but may or may not be enriched in CO relative to the gaseous mixture (depending, at least in part, on whether the separation process is operated to provide an $H_2$/CO product stream enriched in $H_2$ and CO or enriched in $H_2$ only). Preferably, the $CO_2$ enriched stream is at least about 70 mole %, preferably at least about 80 mole %, and more preferably at least about 85 mole % $CO_2$.

The combustion effluent (obtained from the combustion chamber, i.e. the enclosure within which the support fuel and $CO_2$ enriched streams are combusted) contains, as noted, the combustion product(s) of the combustible component(s) of the support fuel and $CO_2$ enriched streams. In the case of $H_2$, the combustion product is $H_2O$. In the case of CO, the combustion product is $CO_2$. In the case of $CH_4$ and other light hydrocarbons, the combustion products are $CO_2$ and $H_2O$. In the case of $H_2S$, the combustion products are $SO_x$ ($SO_2$ and $SO_3$) and $H_2O$. In the case of other combustible sulphur containing components such as COS and $CS_2$ the combustion products are $CO_2$ and $SO_x$.

As noted above, all or substantially all of the combustible components present in the $CO_2$ enriched stream and support fuel stream are combusted to form their combustion products. More specifically, preferably at least 99% of the combustible component(s) (in total) present in each of the $CO_2$ enriched stream and support fuel stream are combusted to form their combustion products. As such, preferably at most 1% of the combustible component(s) (in total) present in the $CO_2$ enriched and support fuel streams remain in the combustion effluent as uncombusted combustible components (residual combustibles). The percentage of combustible components that are combusted, and percentage that remain as residual combustibles in the combustion effluent, can be calculated from the total moles of combustible components in the $CO_2$ enriched and support fuel streams versus the combustion effluent (i.e., if for example the $CO_2$ enriched stream and support fuel stream were, in combination, to contain 100 kmol/hr of combustible components (of all types) and the combustion effluent were to contain 1 kmol/hr of combustible components (of all types) then in this case 99% of the combustible components would be combusted, and 1% would remain as residual combustibles). Devices suitable for monitoring and measuring the compositions of streams, and thus suitable for measuring the content of combustible components in the $CO_2$ enriched stream, support stream and combustion effluent, will be known to one of ordinary skill in the art.

The $CO_2$ product stream has a $CO_2$ concentration of preferably at least about 90 mole %, more preferably at least about 95 mole %, more preferably at least about 98 mole %. The $CO_2$ product stream is preferably substantially, and may be entirely, free of $H_2$, CO, $H_2S$ and any other combustible components present in the gaseous mixture. The $CO_2$ product stream may be pure or essentially pure $CO_2$. Where the combustion products present in the combustion effluent consist of $CO_2$, or of $CO_2$ and only minor amounts of other products (in levels that are acceptable in the desired $CO_2$ product), the combustion effluent may form the $CO_2$ product without any additionally processing of the combustion effluent to change the composition thereof (the combustion effluent may, for example, still be cooled to extract useful heat and/or work therefrom, and or compressed or expanded depending on the pressure at which it is obtained and desired end use of the $CO_2$ product). Typically, however, the combustion effluent will contain $H_2O$ and/or $SO_x$ (as a result of combustion of $H_2S$ present in one or both of the support fuel and $CO_2$ enriched streams) in amounts greater than desired in the $CO_2$ product. Where the combustion products include $H_2O$, the combustion effluent may be cooled to condense out water and/or otherwise dried to form the $CO_2$ product stream. Where the combustion products include $SO_x$, the combustion effluent may be further processed remove $SO_x$ via any suitable means (for example, via means as will be discussed in further detail below).

The support fuel stream comprises, as noted, one or more combustible components and is combusted to form a stable flame that acts as the ignition source for combustion of the combustible component(s) present in the $CO_2$ enriched stream. Although the $CO_2$ enriched stream contains one or more combustible components, the composition (i.e. concentration of combustible components and overall calorific value) of the $CO_2$ enriched stream is or may be such that, under the intended conditions under which combustion is to take place (i.e. the intended flow rate and composition of oxidant, intended operating temperature within the combustion chamber, and so forth), it cannot be combusted to form and sustain a stable flame (i.e. a flame that does not go out without a constant external ignition source such as another flame provided by combustion of a separate fuel stream). Consequently, a support fuel stream is combusted that has a composition which, under the intended conditions under which combustion is to take place, does combust to form and sustain a stable flame. This flame then acts as the constant ignition source required for combustion also of the combustible component(s) present in the $CO_2$ enriched stream (thus satisfying the combustion triangle, i.e. oxidant-fuel-ignition source, that is always required for any combustion to occur).

The necessary composition of the support fuel stream, required to form and sustain a stable flame in view of the operating conditions under which combustion is to take place, can be determined experimentally by one of ordinary skill in the art, without undue burden. Formation of a stable flame can, for example, be determined visually via one or more peep holes and/or via one or more automated flame detectors, e.g. one or more fire eyes, appropriately located within the combustion chamber. Formation of a stable flame may, for example, also be monitored indirectly via monitoring the composition of the $CO_2$ enriched stream and combustion effluent since, as previously noted, should the flame go out then the proportion of combustible components that are not combusted (and thus remain as residual combustibles in the combustion effluent) will rise.

Although the ability of a stream to form a stable flame is not dictated solely by its HHV, streams with higher HHVs tend to be more stably combustible, and the HHV of the support fuel stream will therefore typically be higher than that of the $CO_2$ enriched stream. In preferred embodiments of the invention, the $CO_2$ enriched stream has a HHV of below 100 Btu/scf (3750 kJ/scm), such as from below 100 Btu/scf (3750 kJ/scm) down to about 30 Btu/scf (1150 kJ/scm), wherein "scf" refers to a standard cubic foot, i.e. 1 cubic foot at 60 degrees Fahrenheit (15.6 degrees Celsius) and 14.696 psi (101.325 kPa), and "scm" refers to a standard cubic meter, i.e. 1 cubic meter under the aforesaid conditions. The support fuel stream preferably has a HHV of above 100 Btu/scf (3750 kJ/scm), more preferably above about 120 Btu/scf (4500 kJ/scm), more preferably above about 150 Btu/scf, and typically up to about 1300 Btu/scf (50,000 kJ/scm).

The support fuel stream may be combusted in any suitable design of burner. For example, the support fuel stream may be combusted using pilot burners of a type commercially available and sold for combusting natural gas or #2 light oil, such as John Zink Mark I or II burners (available from John Zink Company, LLC, 11920 East Apache, Tulsa, Okla. 74116, USA) or a number of burners available from Hamworthy (Hamworthy Combustion Engineering Ltd, Fleets Corner, Poole, Dorset, BH17 0LA, the United Kingdom).

The heat provided by combustion of the support fuel stream can be adjusted, if desired, by adjusting the amount of heat removed in the combustion zone by either providing refractory lining or providing cooling, e.g. water jacketing. Combustion of the support fuel stream supplies sufficient heat for the resulting flame to act as the ignition source for combustion of all or substantially all of the combustible components present in the $CO_2$ enriched stream. The amount of heat required will depend on a number of factors (such as the composition of the $CO_2$ enriched stream, composition of the oxidant stream(s) supplying the oxygen for combustion, removal of heat from the combustion zone, and so forth), and may again be determined experimentally by the skilled person without undue burden (determination of whether or not all or substantially all the combustible components have been combusted being possible by, as noted above, measuring the composition of the $CO_2$ enriched stream and combustion effluent). Typically, however, combustion of the support fuel stream need supply only from about 1% to about 20%, and more typically from 5% to 10%, of the total heat input from combustion of the support fuel and $CO_2$ enriched streams.

As previously noted, both the support fuel stream and the $CO_2$ enriched stream are combusted in the presence of sufficient $O_2$ to combust all or substantially all of the combustible component(s) present in said streams. The amount of $O_2$ supplied for combustion is therefore preferably at least equal to, and more preferably in excess of the stoichiometric amount (i.e. the amount theoretically required for complete combustion of all of the combustible component(s) of said streams). The oxidant stream or streams mixed with the support fuel and $CO_2$ enriched streams may, for example, be pure oxygen, air, oxygen enriched air, or a previously oxygen depleted stream into which further oxygen has been injected (e.g. a recycled portion of the combustion effluent and/or another flue gas that has been enriched with further oxygen). However, it is preferred that the oxidant stream(s) have an oxygen concentration of greater than 21 mole %, i.e. are enriched in oxygen as compared to air (at atmospheric pressure), and more preferred that the oxidant stream(s) have an oxygen concentration of at least about 90 mole %. Most preferably, the oxidant stream(s) are pure or substantially pure oxygen. In addition to helping stabilize combustion (by reducing the minimum HHV required of the support fuel stream for formation of a stable flame and reducing the minimum amount of heat, supplied by combustion of the support fuel stream, that is required for combustion of all or substantially all of the combustible component(s) of the $CO_2$ enriched stream), higher oxygen purities reduce the amount of nitrogen in the combustion effluent, which may: reduce or eliminate the need for processing of the combustion effluent to remove nitrogen in order to form the $CO_2$ product; reduce the volume of combustion effluent, thereby reducing the volume of gas that needs to be processed in any way to form the $CO_2$ product; and/or increase the temperature of the combustion effluent, thereby increasing the amount of heat that may be extracted for useful purposes, such as raising and/or superheating steam.

Where the support fuel stream comprises and/or the $CO_2$ enriched stream contains $H_2S$, such that the combustion products in the combustion effluent comprise $SO_x$ and $H_2O$, and $SO_x$ and $H_2O$ are removed from the combustion effluent in order to form the $CO_2$ product stream, $SO_x$ and $H_2O$ may (as noted above) be removed by any suitable means known in the art. However, in preferred embodiments they are removed by:

cooling the combustion effluent to condense out water and convert $SO_3$ to sulfuric acid;

maintaining said cooled combustion effluent at elevated pressure(s) in the presence of $O_2$, water and $NO_x$, for a sufficient time to convert $SO_2$ to sulfuric acid and $NO_x$ to nitric acid; and separating water, sulfuric acid and nitric acid from said cooled combustion effluent.

This process by which $SO_x$ is removed may, in particular, be a process as described in US-A1-2007/0178035, preferred features of this process being, therefore, as described in this document. In particular, substantially all (or all) of the $SO_x$ and the bulk, usually at least about 90%, of any $NO_x$ is preferably removed. The combustion effluent is usually produced at a pressure of from about 0.1 MPa (1 bar) to about 0.7 MPa (7 bar), and more typically from about 0.1 MPa (1 bar) to about 0.2 MPa (2 bar), depending at least in part on the pressure at which the $CO_2$ enriched stream is obtained and combusted, and may be compressed to the elevated pressure if and as required. The elevated pressure is usually at least about 0.3 MPa (3 bar) and preferably from about 1 MPa (10 bar) to about 5 MPa (50 bar). Contact time (or "hold-up") between the gaseous components and the liquid water after elevation of the pressure affects the degree of conversion of $SO_2$ to $H_2SO_4$ and $NO_x$ to $HNO_3$, a total "hold-up" time of no more than 60 seconds usually being sufficient for maximum conversion of $SO_2/NO_x$. Counter current gas/liquid contact devices such as columns or scrub towers allow intimate mixing of water with the gaseous components for continuous removal of $SO_2$ and $NO_x$, and thus constitute suitable devices for providing the required contact time for the conversion(s). The $O_2$ required for the conversions may be added although an amount of $O_2$ may be present in the combustion effluent, for example where a stoichiometric excess of $O_2$ was used during combustion. Water is typically present in the combustion effluent as one of the combustion products, but further water may be added if required. Likewise, NOx may already be present in the combustion effluent, and/or may be added as required.

Preferably, the gaseous mixture is separated to provide the $H_2$/CO product stream and $CO_2$ enriched stream using pressure swing adsorption (PSA). The gaseous mixture may be separated in a single PSA system to provide the $H_2$/CO product stream and $CO_2$ enriched stream (and, in the first aspect of the invention, optionally also the support fuel stream, as will be further discussed below). Alternatively, the gaseous mixture may be separated to provide the $H_2$/CO product stream and $CO_2$ enriched stream (and, in the first aspect of the invention, optionally also the support fuel stream) using two or more PSA systems in series and/or parallel. The separation of the gaseous mixture to provide the $H_2$/CO product stream and $CO_2$ enriched stream (and, in the first aspect of the invention, optionally also the support fuel stream) could also involve the use of one or more PSA systems and one or more other types of separation system.

The or each PSA system may comprise a plurality of adsorbent beds, as is known in the art. For example, the or each system may comprise a plurality of beds, with the PSA cycles of the individual beds being appropriately staggered so that at any point in time there is always at least one bed undergoing adsorption and at least one bed undergoing regeneration, such that the system can continuously separate the stream fed to it. The or each system could also, for example, alternatively or additionally comprise more than one bed arranged in series and undergoing adsorption at the same time, the gas passing through one bed being passed to the next bed in the series, and with gases desorbed from the beds during regeneration being appropriately combined.

The or each PSA system comprises adsorbent selective for one or more components over one or more other components of the stream which the PSA system is to separate (i.e. the PSA system comprises adsorbent that adsorbs one ore more components of said stream preferentially to one or more other components of said stream, or, to put it another way, that adsorbs one or more components of said stream with greater affinity than one or more other components of said stream). The system may comprise a single type of adsorbent, selective for all the components that are to be selectively adsorbed, or more than one type of adsorbent that in combination provide the desired selective adsorption. Where more than one type of adsorbent is present, these may be intermixed and/or arranged in separate layers/zones of a bed, or present in separate beds arranged in series, or arranged in any other manner as appropriate and known in the art.

For example, where the gaseous mixture is to be separated in a single PSA system, the PSA system will typically comprise adsorbent selective for at least $H_2S$ and $CO_2$ over $H_2$. If the $H_2$/CO product is to be depleted also in CO then the adsorbent would be selective for CO over $H_2$ also. Exemplary adsorbents include carbons, aluminas, silica gels and molecular sieves. A single layer of silica gel may be used to obtain an $H_2$/CO product that is an $H_2$ and CO enriched gas, a single layer of silica gel or a silica gel/carbon split may be used to obtain $H_2$/CO product that is gas turbine grade $H_2$, or a silica gel/carbon/5A zeolite split may be used to obtain $H_2$/CO product that is high purity $H_2$. A suitable type of silica gel for use as an adsorbent is, for example, the high purity silica gel (greater than 99% $SiO_2$) described in US-A1-2010/0011955, the disclosure of which is incorporated herein by reference.

The or each PSA system may, for example, be operated in the same way as known PSA processes for separating $H_2$ from a feed stream, with all known cycle options appropriate to this technology area (e.g. cycle and step timings; use, order and operation of adsorption, equalization, repressurisation, depressurisation and purge steps; and so forth). The PSA cycle employed will, of course, typically include at least an adsorption step and blowdown/depressurisation and purge steps. During the adsorption step the stream to be separated is fed at super-atmospheric pressure to the bed(s) undergoing the adsorption step and components of the stream are selectively adsorbed, the gas pushed through the beds during this step therefore being enriched in the components for which the adsorbent is not selective. During the blowdown/depressurisation step(s) and purge step the pressure in the bed(s) is reduced and a purge gas passed through the bed(s) to desorb the components adsorbed during the previous adsorption step, thereby providing gas enriched in the selectively adsorbed components and regenerating the bed(s) in preparation for the next adsorption step. Where the gaseous mixture is to be separated in a single PSA system, the $H_2$/CO product stream will therefore typically be formed, at least in part, from at least a portion of the gas pushed through the beds of the PSA system during the adsorption step, and the $CO_2$ enriched stream will typically be formed, at least in part, from at least a portion of the gas obtained from the blowdown and/or purge steps.

The adsorption step may, for example, be carried out at a pressure of about 0.5-10 MPa (5-100 bar) absolute and at a temperature in the range of about 10-60° C. During the depressurization and purge steps of the cycle the pressure in the bed is reduced to the base level used during the cycle. Typically this will be down to pressures at or slightly above atmospheric (i.e. at or slightly above 0.1 MPa), or down to sub-atmospheric pressures in the case of a vacuum pressure swing adsorption (VPSA) process. However higher pressures for the blowdown and purge steps may also be employed if desired (although the performance of the PSA system will decrease where the base pressure of the PSA is higher, due to the dynamic capacity of the PSA system being decreased, the gas obtained from the blowdown and purge steps will be obtained at higher pressure, which may be beneficial where compression of these gases for further use is required). The gas used for purging can be preheated at least in part before use. If heating is used, then a typical temperature that the purge gas is raised to is in the range about 150° C. to about 300° C.

According to the first aspect of the invention, the support fuel stream is, as noted above, generated on-site in one of a number of ways.

In one embodiment, the support fuel stream is a gaseous stream derived from the production of the gaseous mixture. The gaseous mixture may, for example, be a crude syngas mixture formed by gasifying or reforming a carbonaceous feedstock and, optionally: quenching the initially produced syngas mixture to remove particulates; and/or subjecting the initially produced mixture or the quenched mixture to a water-gas shift reaction; and/or removing water from the initially produced, quenched and/or shifted mixture (e.g. by cooling and condensing out at least part of the water present in said mixture). In such circumstances, the support fuel stream may be formed from: a vapour obtained from a waste water stream from quenching and/or removing water from the syngas mixture; and/or from a portion of the syngas mixture prior to quenching, water-gas shift, and/or removal of water. Where the support fuel stream is obtained in this way, it will typically be obtained at relatively high temperature and pressure (higher than needed for supporting combustion of the $CO_2$ enriched stream). Thus, prior to combustion to form a stable flame to act as the ignition source for combustion of the combustible component(s) present in the $CO_2$ enriched stream, the support fuel stream may be expanded to generate useful work.

In another embodiment, the support fuel stream may simply be a portion of the gaseous mixture that is taken to form the support fuel stream rather than being separated to provide the $H_2$/CO product stream and the $CO_2$ enriched stream.

In another embodiment, the support fuel stream is a stream separated from the gaseous mixture in addition to the $H_2$/CO product stream and $CO_2$ enriched stream. As noted above, the gaseous mixture is, preferably, separated to provide the $H_2$/CO product stream and $CO_2$ enriched using one or more pressure swing adsorption (PSA) systems, in which case the gaseous mixture may be separated to provide also the support fuel stream using said one or more PSA systems.

Where the gaseous mixture is separated in a single PSA system to provide the $H_2/CO$ product stream, the $CO_2$ enriched stream and the support fuel stream, the $CO_2$ enriched stream may be formed from gas withdrawn during the blowdown step, and the support fuel stream may be formed from gas withdrawn during the purge step. In the purge step the bed(s) are purged with a $CO_2$ and $H_2S$ depleted (relative to the gaseous mixture) gas, such as for example a portion of the gas pushed through the bed(s) during the adsorption step, to assist desorption of the adsorbed species, with the result that the gases obtained during the purge step will typically have a higher concentration of combustible components (in particular $H_2$), and a greater HHV, than the gases obtained during the blowdown step. The gases obtained during the purge step may therefore be suitable for use as a support fuel stream, even though the combination of the gases obtained from the blowdown and purge steps would not.

Alternatively, where the gaseous mixture is separated in a single PSA system to provide the $H_2/CO$ product stream, the $CO_2$ enriched stream and the support fuel stream, the $CO_2$ enriched stream and support fuel stream may be formed from gases withdrawn at different points in time during the same blowdown and/or purge step(s). For example, where countercurrent blowdown and purge steps are employed (i.e. the blowdown and purge gases are removed from the opposite end of the bed to that from which gas is removed during the adsorption step), the gas initially removed will typically contain a higher concentration of the more strongly adsorbed species (e.g. $CO_2$ and $H_2S$), while the gas at the end of the step will typically contain a higher concentration of less strongly adsorbed species (e.g. $H_2$ or CO and $H_2$). Depending on composition of the gaseous mixture and reaction conditions during the adsorption step, the gas removed at the beginning of the blowdown or purge step may therefore have a higher concentration of combustible components and a greater HHV than the gas removed at the end of that step, or vice-versa. Accordingly, the support fuel stream may be formed from whichever of the gases withdrawn at the start or end of the step has the higher concentration of combustible components and greater HHV, and the $CO_2$ enriched stream may be formed from the other of said gases.

In another arrangement, the gaseous mixture may be separated using two PSA systems processes operated in parallel (preferred adsorbents for use in each of said systems being the same as described above for use in a single PSA system for separating the gaseous mixture). One PSA system may be operated under one set of operating conditions to separate part of the gaseous mixture to provide an $H_2$ enriched stream (typically formed, at least in part, from the gas pushed through during the adsorption step) and the $CO_2$ enriched stream (typically formed, at least in part, from at least a part of the of gas obtained during blowdown and/or purge), and another PSA system may operated under a different set of operating conditions to separate another part the gaseous mixture to provide an $H_2$ enriched stream (typically formed, at least in part, from the gas pushed through during the adsorption step) and the support fuel stream (typically formed, at least in part, from at least a part of the of gas obtained during blowdown and/or purge), the $H_2/CO$ product stream being formed from one or both of said $H_2$ enriched streams.

For example, by operating one of the PSA systems using an adsorption step at a higher pressure than optimal (for separating $CO_2$ and $H_2S$ from $H_2$ or $H_2$ and CO), a higher concentration of $H_2$ and/or CO may be adsorbed and/or retained in the bed voids, with the result that a higher concentration of $H_2$ or $H_2$ and CO may be obtained in the gases obtained during blowdown and/or purge. The support fuel stream may then be formed from the blowdown and/or purge gases from this PSA system, while the $CO_2$ enriched stream is formed from the blowdown and/or purge gases from the other PSA system which is operated using an adsorption step at a lower pressure (that is more optimal for separation of $CO_2$ and $H_2S$ from $H_2$ or $H_2$ and CO).

In another arrangement, the gaseous mixture may be separated using two PSA systems in series, wherein the gaseous mixture is separated by a first PSA system to provide an $H_2$ or $H_2$ and CO enriched stream and a stream comprising $H_2S$ and $CO_2$, and the $H_2$ or $H_2$ and CO enriched stream is separated in the second PSA system to provide the $H_2/CO$ product stream and a $CO_2$ containing stream, wherein: the $CO_2$ enriched stream is formed from one of said stream comprising $H_2S$ and $CO_2$ and said stream containing $CO_2$, and the support fuel stream is formed from the other of said streams; or the $CO_2$ enriched stream is formed from one or both of said stream comprising $H_2S$ and $CO_2$ and said stream containing $CO_2$, and the support fuel stream is formed from another $H_2$ or $H_2$ and CO enriched stream separated from the gaseous mixture by the first PSA system.

The $H_2$ enriched stream(s) formed in this arrangement are enriched in $H_2$ and (if present in the gaseous mixture) optionally CO relative to the gaseous mixture, but are not as enriched in $H_2$ (or, optionally, $H_2$ and CO) as the $H_2/CO$ product stream. The first and second PSA systems may, for example, each use adsorbent as described above for use in a single PSA system for separating the gaseous mixture. Alternatively, where the $H_2$ enriched stream obtained from the first PSA system is free or substantially free of $H_2S$ then the second PSA process may not need to adsorb $H_2S$, in which case carbon and zeolite based adsorbents may be preferable. Equally, where the first PSA system is to recover all or substantially all of the $H_2S$ in the $CO_2$ containing stream obtained therefrom, and bulk separation of $CO_2$ from $H_2$ (or $H_2$ and CO) is to be carried out in the second PSA system, the first PSA system may use adsorbent that maximizes the selectivity of the system for $H_2S$ over even $CO_2$, such as a surface modified or impregnated activated carbon.

In one embodiment, the separation of the gaseous mixture to provide the $H_2/CO$ product stream, $CO_2$ enriched stream and support fuel stream may comprise separating the gaseous mixture to provide the support fuel stream, which comprises $H_2S$ and $CO_2$, and a stream depleted in $H_2S$ and enriched in $H_2$ or $H_2$ and CO, and separating said stream depleted in $H_2S$ to provide the $H_2/CO$ product stream and the $CO_2$ enriched stream. In this embodiment, the support fuel stream preferably has an $H_2S$ concentration of at least about 4 mole %, and more preferably of from about 20 mole % to about 80 mole %, the stream depleted in $H_2S$ is preferably free or substantially free of $H_2S$ (and thus the $CO_2$ enriched stream is likewise preferably free or substantially free of $H_2S$).

Preferably, the method according to this embodiment is carried out using two PSA systems in series, as described above. Alternatively, the separation of the gaseous mixture to provide the support fuel stream, which comprises $H_2S$ and $CO_2$, and a stream depleted in $H_2S$ and enriched in $H_2$ or $H_2$ and CO, could be carried out in another type of separation system (such as, for example, a liquid solvent system, such as Selexol™, Rectisol®, or another acid gas removal system) in place of the first PSA system.

In another embodiment, the separation of the gaseous mixture to provide the $H_2/CO$ product stream, $CO_2$ enriched stream and support fuel stream may comprise separating the gaseous mixture to provide the $CO_2$ enriched stream, which comprises $H_2S$ and $CO_2$, and a stream depleted in $H_2S$ and enriched in $H_2$ or $H_2$ and CO, and separating said $H_2S$ depleted stream to provide the support fuel stream, which comprises $CO_2$ and $H_2$ or $H_2$ and CO, and the $H_2$/CO product stream.

Preferably, the method according to this embodiment is carried out using two PSA systems in series, as described above. The $H_2$/CO product stream may preferably be a high purity $H_2$ product for use in a chemicals plant or refinery, having an $H_2$ concentration of for example at least about 99.9 mole %, and the stream depleted in $H_2S$ and enriched in $H_2$ or $H_2$ and CO may preferably have an $H_2$ concentration of for example at least about 90 mole %, which would therefore be suitable as a fuel for power production. In this case, the first PSA system may preferably provide at least two streams depleted in $H_2S$ and enriched in $H_2$ or $H_2$ and CO, with one of the streams being sent to the second PSA system for further separation and another being used as a fuel for power production.

In another embodiment, the separation of the gaseous mixture to provide the $H_2$/CO product stream, $CO_2$ enriched stream and support fuel stream may comprise separating the gaseous mixture to provide the $H_2$/CO product stream and a stream which is then further separated to provide the $CO_2$ enriched stream and the support fuel stream.

For example, the gaseous mixture may be separated by a first PSA system into the $H_2$/CO product stream and a stream comprising $CO_2$ and $H_2S$ (and, typically at least some $H_2$ or $H_2$ and CO), and the latter stream may then be separated by a second PSA system into the $CO_2$ enriched stream (which is preferably free or substantially free of $H_2S$) and the support fuel stream comprising $H_2S$ and $CO_2$ (preferably comprising at least about 4 mole % $H_2S$, and more preferably from about 20 to about 80 mole % $H_2S$).

In another embodiment, the support fuel stream may be a portion of the $H_2$/CO product that is taken and used as the support fuel stream.

In another embodiment, the support fuel stream may be derived from the $H_2$/CO product, such as where the support fuel stream is a stream resulting from further processing of all or a portion of the $H_2$/CO product stream. For example, where the $H_2$/CO product stream is a pure or substantially pure syngas, it may be used to synthesized products such as substitute natural gas, methanol, or Fischer-Tropsch (F-T) products. In this event, the support fuel stream could be taken from a portion of these further products, or could be obtained as a byproduct from the further processing the $H_2$/CO product, for example such as a vent streams from a coldbox for $H_2$/CO separations, or a recycle stream from a F-T or methanation reactor.

According to the second aspect of the invention, the support fuel stream contains, as noted above, at least 50 ppm $H_2S$. More preferably, the support fuel stream contains at least 1 mole % $H_2S$. Examples of suitable support fuel streams which may be obtained from other processes (whether located on- or off-site) include: refinery offgas; refinery fuel gas; producer gas; coke oven offgas; and Claus gas (feed gas for a Claus process).

Claus gas, for example, may typically comprise about 40 mol % or more $H_2S$ with the remainder being $CO_2$ (a mixture of 40% $H_2S$ and 60% $CO_2$ mixture having a nominal HHV of 240 Btu/scf) and therefore constitutes a suitable support fuel stream. The $H_2S$ in the Claus gas used as the support fuel stream would be converted to $SO_x$, which can then be removed alongside $SO_x$ generated from the $CO_2$ enriched stream in manners described above, and the $CO_2$ from the Claus gas would be combined with the $CO_2$ from the $CO_2$ enriched stream. The use of Claus gas, in whole or in part, could reduce the load on the existing sulfur treatment unit of the Claus process to which it would otherwise have been sent, allowing for potential debottlenecking of the sulfur recovery unit (SRU).

Equally, instead of a gas stream comprising at least about 40% $H_2S$, a stream having a somewhat lower $H_2S$ content could be used, which stream might not be suitable for, or at least not ideally suited for processing in a Claus plant in view of its lower $H_2S$ content. In this case, the use of the stream as a support fuel stream in the present process would provide an alternative means of handling the stream, rather than having to further treat the stream to increase its $H_2S$ content to a level suited for the Claus plant.

Similar benefits (to those obtained from using a Claus gas) could, for example, also be obtained by using as the support fuel stream a refinery fuel gas (typically 600-1250 Btu/scf). Refinery fuel gas, as for example produced from an intermediate flash step, likewise contains significant amounts of $CO_2$. Combustion of such gas in the method of the present invention as a support fuel stream again allows the $CO_2$ from the refinery fuel gas to be captured alongside the $CO_2$ from the $CO_2$ enriched stream.

In both the first and second aspects of the invention, the method may also employ more than one support fuel streams. The method may, for example, employ more than one support fuel stream obtained (in the same or different manners) on-site in accordance with the first aspect of the invention, or more than one support fuel stream in accordance with the second aspect of the invention (being of the same or different composition and/or origin), or one or more support fuel streams in accordance with the first aspect of the invention and one or more support fuel streams in accordance with the second aspect of the invention. Equally, the method may employ one or more support fuel streams in accordance with the first and/or second aspects of the invention, as well as one or more traditional support fuel streams, in which event the replacement of at least some traditional support fuel (that would otherwise have been required to support combustion) with a support fuel stream as defined above will still reduce reliance on an imported and costly source of support fuel. Where more than one support fuel stream is used, in addition to combusting at least one support fuel stream to form a stable flame to act as the ignition source for combustion of the combustible component(s) in the $CO_2$ enriched stream, one or more other support fuel streams may be mixed with the $CO_2$ enriched stream, prior to contacting the latter with the stable flame and oxygen, so as to increase the concentration of combustible components in and/or HHV of the $CO_2$ enriched stream.

Aspects of the invention include:

1. A method of treating a gaseous mixture, comprising $CO_2$, $H_2$, $H_2S$, optionally CO, and optionally one or more additional combustible components, to obtain an $H_2$ or $H_2$ and CO product stream ($H_2$/CO product stream) and a $CO_2$ product stream, the method comprising:

separating the gaseous mixture to provide the $H_2$/CO product stream and a $CO_2$ enriched stream, the $CO_2$ enriched stream containing at least one combustible component selected from $H_2S$, $H_2$, CO and any additional combustible components present in the gaseous mixture;

obtaining a support fuel stream comprising one or more combustible components, wherein said support fuel stream is a gaseous stream derived from the production of the gaseous mixture, is a portion of the gaseous mixture, is separated from the gaseous mixture in addition to the $H_2$/CO product stream and $CO_2$ enriched stream, is a portion of the $H_2/CO$ product, or is derived from the $H_2/CO$ product;

combusting the support fuel stream, in the presence of sufficient $O_2$ to combust all or substantially all of the combustible component(s) present in said support fuel stream, to form a stable flame to act as the ignition source for combustion of the combustible component(s) present in the $CO_2$ enriched stream;

contacting the $CO_2$ enriched stream, said flame and sufficient $O_2$ to combust all or substantially all of the combustible component(s) present in said $CO_2$ enriched stream and form a combustion effluent comprising $CO_2$ and the combustion product(s) of the combustible component(s) of the support fuel and $CO_2$ enriched streams; and forming the $CO_2$ product stream from said combustion effluent.

2. A method according to #1, wherein the gaseous mixture is a crude syngas mixture formed by gasifying or reforming a carbonaceous feedstock and, optionally: quenching the initially produced syngas mixture to remove particulates; and/or subjecting the initially produced mixture or the quenched mixture to a water-gas shift reaction; and/or removing water from the initially produced, quenched and/or shifted mixture.

3. A method according to #2, wherein said support fuel stream is a gaseous stream derived from the production of the gaseous mixture, and is formed from: a vapour obtained from a waste water stream from quenching and/or removing water from the syngas mixture; and/or from a portion of the syngas mixture prior to quenching, water-gas shift, and/or removal of water.

4. A method according to #1, wherein said support fuel stream is a portion of the gaseous mixture taken to form said support fuel stream instead of being separated to provide the $H_2/CO$ product and a $CO_2$ enriched streams.

5. A method according to #1, wherein said support fuel stream is a stream separated from the gaseous mixture in addition to the $H_2/CO$ product stream and $CO_2$ enriched stream.

6. A method according to #5, wherein the gaseous mixture is separated to provide the $H_2/CO$ product stream, the $CO_2$ enriched stream and the support fuel stream using one or more pressure swing adsorption (PSA) systems.

7. A method according to #6, wherein the gaseous mixture is separated in a PSA system to provide the $H_2/CO$ product stream, the $CO_2$ enriched stream and the support fuel stream, whereby the $CO_2$ enriched stream is formed from gas withdrawn during a blowdown step and the support fuel stream is formed from gas withdrawn during a purge step.

8. A method according to #6, wherein the gaseous mixture is separated in a PSA system to provide the $H_2/CO$ product stream, the $CO_2$ enriched stream and the support fuel stream, whereby the $CO_2$ enriched stream and support fuel stream are formed from gases withdrawn at different points in time during the same blowdown and/or purge step(s).

9. A method according to #6, wherein the gaseous mixture is separated using two PSA systems operated in parallel, wherein one PSA system is operated under one set of operating conditions to separate part of the gaseous mixture to provide an $H_2$ enriched stream and the $CO_2$ enriched stream, and another PSA system is operated under a different set of operating conditions to separate another part the gaseous mixture to provide an $H_2$ enriched stream and the support fuel stream, the $H_2/CO$ product stream being formed from one or both of said $H_2$ enriched streams.

10. A method according to #6, wherein the gaseous mixture is separated using two PSA systems operated in series, wherein the gaseous mixture is separated by a first PSA system to provide an $H_2$ or $H_2$ and CO enriched stream and a stream comprising $H_2S$ and $CO_2$, and the $H_2$ or $H_2$ and CO enriched stream is separated in the second PSA system to provide the $H_2/CO$ product stream and a stream containing $CO_2$, wherein: the $CO_2$ enriched stream is formed from one of said stream comprising $H_2S$ and $CO_2$ and said stream containing $CO_2$, and the support fuel stream is formed from the other of said streams; or the $CO_2$ enriched stream is formed from one or both of said stream comprising $H_2S$ and $CO_2$ and said stream containing $CO_2$, and the support fuel stream is formed from another $H_2$ or $H_2$ and CO enriched stream separated from the gaseous mixture by the first PSA system.

11. A method according to #5, wherein the gaseous mixture is separated to provide the $H_2/CO$ product stream, the $CO_2$ enriched stream and the support fuel stream by separating the gaseous mixture to provide the support fuel stream, which comprises $H_2S$ and $CO_2$, and a stream depleted in $H_2S$ and enriched in $H_2$ or $H_2$ and CO, and separating said stream depleted in $H_2S$ to provide the $H_2/CO$ product stream and the $CO_2$ enriched stream.

12. A method according to #5, wherein the gaseous mixture is separated to provide the $H_2/CO$ product stream, the $CO_2$ enriched stream and the support fuel stream by separating the gaseous mixture to provide the $CO_2$ enriched stream, which comprises $H_2S$ and $CO_2$, and a stream depleted in $H_2S$ and enriched in $H_2$ or $H_2$ and CO, and separating said stream depleted in $H_2S$ to provide the support fuel stream, which comprises $CO_2$, $H_2$ and optionally CO, and the $H_2/CO$ product stream.

13. A method according to any of #1 to #12, wherein the support fuel stream comprises and/or the $CO_2$ enriched stream contains $H_2S$, such that the combustion products in the combustion effluent comprise $SO_x$ and $H_2O$, and $SO_x$ and $H_2O$ are removed from the combustion effluent in order to form the $CO_2$ product stream.

14. A method of treating a gaseous mixture, comprising $CO_2$, $H_2$, $H_2S$, optionally CO, and optionally one or more additional combustible components, to obtain an $H_2$ or $H_2$ and CO product stream ($H_2/CO$ product stream) and a $CO_2$ product stream, the method comprising:

separating the gaseous mixture to provide the $H_2/CO$ product stream and a $CO_2$ enriched stream, the $CO_2$ enriched stream containing $H_2S$ and, optionally, one or more other combustible components selected from $H_2$, CO and any additional combustible components present in the gaseous mixture;

obtaining a support fuel stream comprising $H_2S$ and, optionally, one or more other combustible components, wherein the support fuel stream contains at least 50 ppm $H_2S$;

combusting the support fuel stream, in the presence of sufficient $O_2$ to combust all or substantially all of the combustible component(s) present in said support fuel stream, to form a stable flame to act as the ignition source for combustion of the combustible component(s) present in the $CO_2$ enriched stream;

contacting the $CO_2$ enriched stream, said flame and sufficient $O_2$ to combust all or substantially all of the combustible component(s) present in said $CO_2$ enriched stream and form a combustion effluent comprising $CO_2$, $SO_x$, $H_2O$ and any other combustion product(s) of any other combustible component(s) additional to $H_2S$ present in the support fuel and $CO_2$ enriched streams; and removing $SO_x$ and $H_2O$ from the combustion effluent so as to form the $CO_2$ product stream from said combustion effluent.

15. A method according to #13 or #14, wherein $SO_x$ and $H_2O$ are removed from the combustion effluent by:
  cooling the combustion effluent to condense out water and convert $SO_3$ to sulfuric acid;
  maintaining said cooled combustion effluent at elevated pressure(s) in the presence of $O_2$, water and $NO_x$, for a sufficient time to convert $SO_2$ to sulfuric acid and $NO_x$ to nitric acid; and
  separating water, sulfuric acid and nitric acid from said cooled combustion effluent.

16. A method according to any of #1 to #15, wherein the gaseous mixture comprises from about 10 to about 60 mole % $CO_2$, from about 500 ppm to about 5 mole % $H_2S$ and from about 35 mole % to the remainder of $H_2$ or, if CO is present, of a mixture of $H_2$ and CO.

17. A method according to any of #1 to #16, wherein the $H_2$/CO product stream is at least about 90 mole % $H_2$ or a mixture of $H_2$ and CO, and contains less than about 50 ppm $H_2S$.

18. A method according to any of #1 to #17, wherein the $CO_2$ enriched stream is at least about 70 mole % $CO_2$.

19. A method according to any of #1 to #18, wherein the $CO_2$ enriched stream has a HHV below 3800 kJ/scm (100 Btu/scf), and the support fuel stream has a HHV above 4500 kJ/scm (120 Btu/scf).

20. A method according to any of #1 to #19, wherein the oxidant stream or streams mixed with the support fuel stream and $CO_2$ enriched stream to supply the $O_2$ for combustion comprise greater than 21% oxygen.

21. A method according to any of #1 to #20, wherein the oxidant stream or streams mixed with the support fuel stream and $CO_2$ enriched stream to supply the $O_2$ for combustion comprise at least 90% oxygen.

Solely by way of example, certain embodiments of the invention will now be described with reference to the accompanying drawings.

Figure 2:
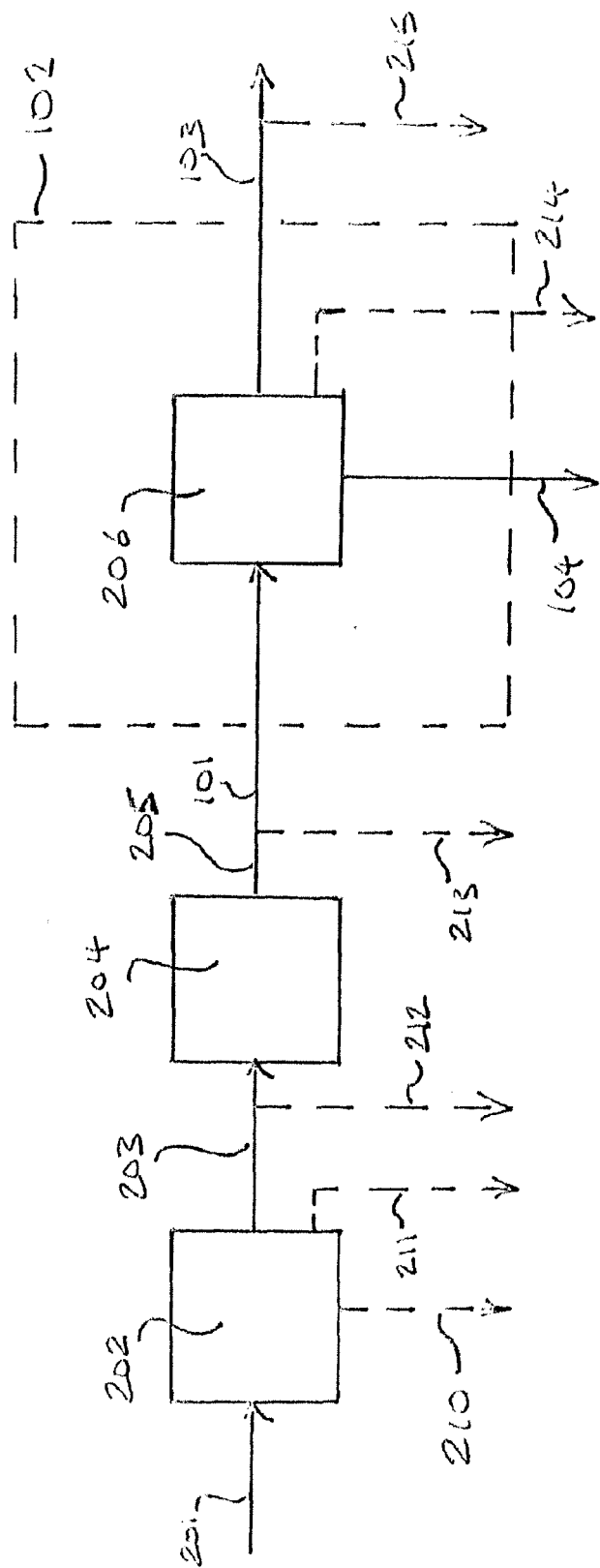
FIG. 2 is a flow sheet depicting various on-site sources of support fuel streams for use in the embodiment depicted in FIG. 1.
Figure 3:
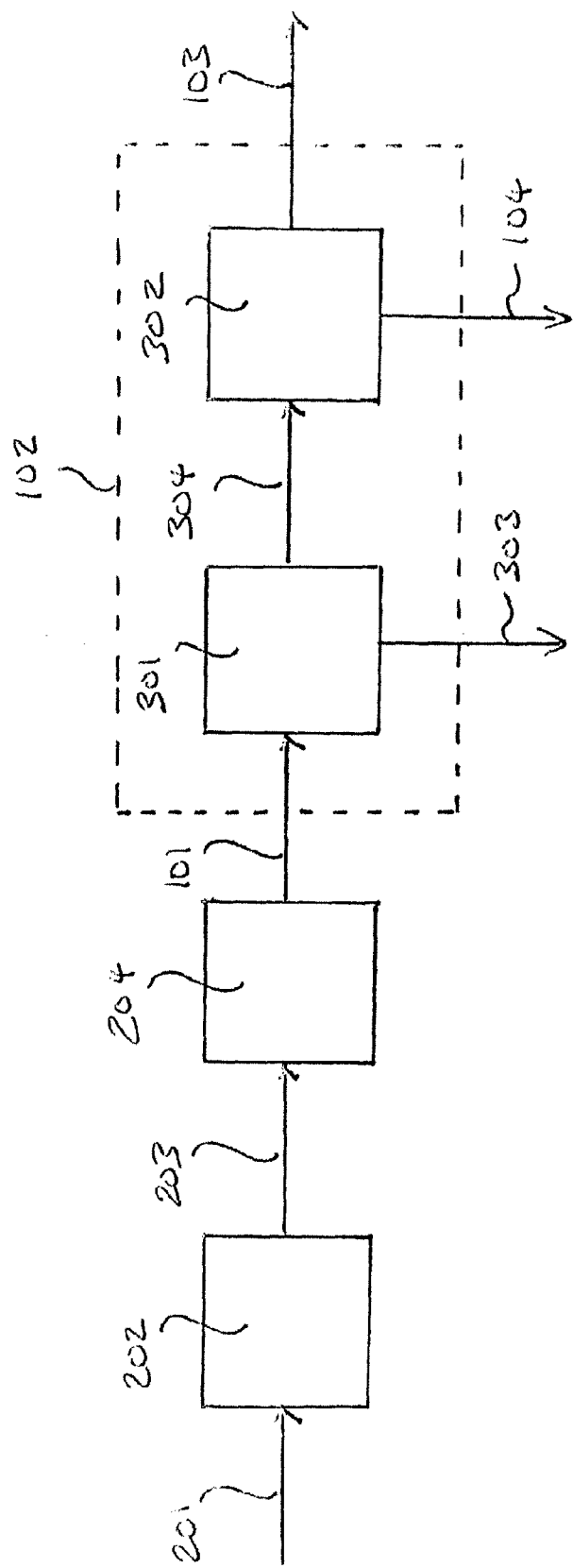
FIG. 3 is a flow sheet depicting further on-site sources of support fuel streams for use in the embodiment depicted in FIG. 1.
Figure 4:
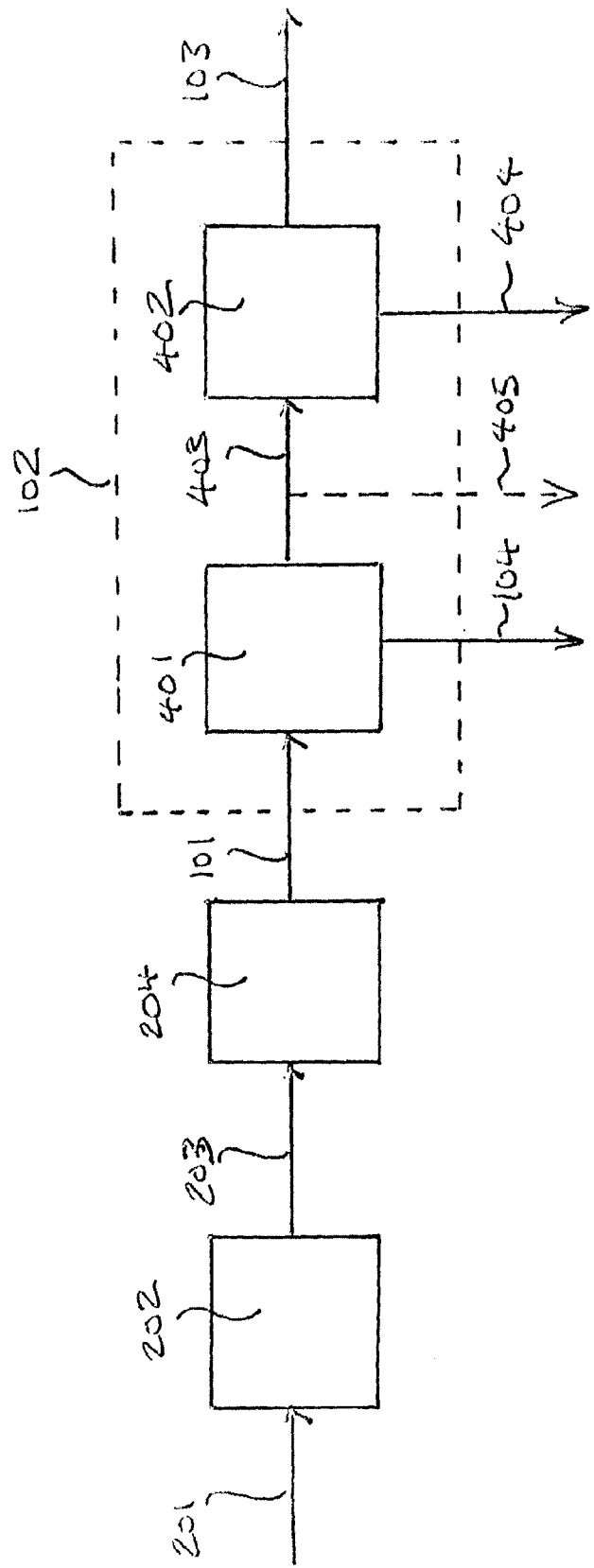
FIG. 4 is a flow sheet depicting further on-site sources of support fuel streams for use in the embodiment depicted in FIG. 1.

Referring to FIG. 1, stream 101 is a crude syngas stream, comprising $H_2$, CO, $CO_2$ and $H_2S$, produced from gasification of a sulphur containing feedstock and that has been quenched and processed in a water-gas shift reactor (as will be further described, with reference to FIGS. 2 to 4). The crude syngas stream 101 is separated in system 102 (which may for example comprise one or more PSA systems, as will also be further described with reference to FIGS. 2 to 4) into a $H_2$/CO product stream 103 and a $CO_2$ enriched stream 104 containing one or more combustible components. $CO_2$ enriched stream is sent to combustion chamber 105 where it is combusted in the presence of oxygen, provided by oxidant stream 106, to produce a combustion effluent 107. Oxidant stream 106 is preferably oxygen enriched air or high purity oxygen.

The composition of the $CO_2$ enriched stream 104 produced by system 102 varies significantly depending on whether it is operated to produce an $H_2$/CO product stream 103 that is a high purity $H_2$ stream intended for chemicals production, or a high purity $H_2$/CO mixture intend for power production (for example by being combusted in a gas turbine). By way of example, Table 1 details the composition of sample $CO_2$ enriched streams produced by a PSA system when operated to produce a high purity $H_2$ stream, or an $H_2$/CO stream for power production, by separating a syngas stream obtained from the gasification of 6 wt % sulphur containing petcoke.

The sulfur content of the feedstock can also have an important effect on the heating value of the resulting $CO_2$ enriched stream produced by a PSA system, as greater amounts of sulphur in the feedstock will translate to greater amounts of $H_2S$ in the syngas feed to the sour PSA system, and $H_2S$ (600 Btu/scf for a pure $H_2S$ stream) has twice the HHV of $H_2$ or CO (~300 Btu/scf for a pure $H_2$/CO mixture). As noted, the values in Table 1 are based on 6 wt % sulphur containing petcoke, which is a medium to high level of sulphur for petcoke. Coals tend to have lower sulfur contents, with a lower level of 0.1 wt % sulphur or below in Chinese brown coals. The HHV of the $CO_2$ enriched streams produced from many low sulphur content feedstocks can therefore be expected to be of lower HHV than the values given in Table 1 (when produced by a PSA system operating under the same conditions).

TABLE 1

Mole Fractions for Sample PSA $CO_2$ enriched streams

| | PSA $CO_2$-stream where $H_2$-stream for: | | |
|---|---|---|---|
| | Chemicals | Power | Units |
| $H_2$ | 0.176 | 0.060 | mol fraction |
| $N_2$ | 0.006 | 0.001 | mol fraction |
| CO | 0.023 | 0.005 | mol fraction |
| $CO_2$ | 0.767 | 0.900 | mol fraction |
| $CH_4$ | 827 | 154 | ppmv |
| Ar | 0.0018 | 0.0012 | mol fraction |
| $HS_2$ | 0.022 | 0.028 | mol fraction |
| $COS/CS_2$ | 35.9 | 45.4 | ppmv |
| $H_2O$ | 0.003 | 0.004 | mol fraction |
| HHV | 80 (3020) | 39 (1470) | Btu/scf (kJ/scm) |
| LHV | 70 (2640) | 35 (1320) | Btu/scf (kJ/scm) |

Thus, the inventors have found that in some cases, in particular such as (but not limited to) where a PSA system is to be operated to produce an $H_2$/CO product stream intended for power production or to produce an $H_2$/CO product stream that is a high purity syngas for use in a chemicals plant, and/or is operated to separate a syngas stream produced from gasification of a low sulphur content feedstock, simple separation of the sygnas into an $H_2$/CO product stream and a $CO_2$ enriched stream may result in a $CO_2$ enriched stream having a composition (i.e. concentration of combustible components and overall calorific value) that is such that, under the intended operating conditions within the combustion chamber, it cannot be combusted to form and sustain a stable flame, and thus cannot be stably combusted without a constant external ignition source (such as provided by combustion of a separate fuel stream).

Referring again to FIG. 1, a support fuel stream 109 is therefore combusted in combustion chamber 105 to form a stable flame to act as the ignition source for combustion of the combustible component(s) present in the $CO_2$ enriched stream. The support fuel stream 109 comprises at least one combustible component, and typically has an HHV greater than that of the $CO_2$ enriched stream 104, the composition and HHV of the support fuel stream being (self-evidently) such that this stream can be combusted in the combustion chamber 105 to form and sustain a stable flame without a constant external ignition source. As will be described in further detail with reference to FIGS. 2 to 4, support fuel stream 109 may be: a gaseous stream derived from the production of the gaseous mixture; a portion of the gaseous mixture; separated from the gaseous mixture in addition to the $H_2$/CO product stream and $CO_2$ enriched stream; a portion of the $H_2$/CO product; or derived from the $H_2$/CO product. Alternatively, support fuel stream, comprising at least 50 ppm $H_2S$, may be obtained from another process. Optionally, a further support fuel stream 108 may also be used, which stream is mixed with $CO_2$ enriched stream 104 to increase the HHV of said stream prior to combustion in combustion chamber 105.

Oxidant stream 106 may be appropriately located and may comprise a sufficient flow rate of oxygen to enable combustion of all or least substantially all the combustible component(s) of both the $CO_2$ enriched and support streams. Alternatively, an additional oxidant stream 110 may employed, with oxidant stream 106 supplying sufficient oxygen to allow combustion of all or least substantially all the combustible component(s) of the $CO_2$ enriched stream and oxidant stream 110 supplying sufficient oxygen to allow combustion of all or least substantially all the combustible component(s) of the support streams. Oxidant stream 110 is likewise preferably oxygen enriched air or, more preferably, high purity oxygen.

$CO_2$ product stream 107 contains the combustion products of the combustible component(s) of both the $CO_2$ enriched and support fuel streams (all, or at least substantially all, of said combustible components having been converted to their combustion products in combustion chamber 105). Either or both of the $CO_2$ enriched product stream and support stream contain $H_2S$, as a result of which the combustion effluent 107 contains the combustion products of $H_2S$, namely $SO_x$ and $H_2O$. Combustion effluent 107 is therefore then sent to system 111 where the $CO_2$ product is cooled, compressed, and maintained at elevated pressure in the presence of $O_2$ and NO (which may be present in the combustion effluent or introduced as necessary) and water (which, as noted above, is already present in the combustion effluent) for sufficient time to covert $SO_x$ to sulfuric acid and $NO_x$ to nitric acid (system 111 being, for example, a system as described in US-A1-2007/0178035). The acids and water are then removed as stream 112 to provide a $CO_2$ product stream 113 that is suitable for geological storage and/or use in EOR.

As noted above, the support fuel stream 108/109 can be obtained from a number of different sources. One option is to use as a support fuel stream any stream obtained from another process and that comprises at least 50 ppm $H_2S$. Examples of such streams include a refinery fuel gas (which will typically have a HHV of between about 600 and 1250 Btu/scf (22500 and 47000 kJ/scm)), or a high $H_2S$ content stream such as a Claus gas (which will typically have a HHV of 200 Btu/scf (7500 kJ/scm) or above). As previously described, the use of such streams as the support fuel provides an economic means of stabilizing combustion of the $CO_2$ enriched stream and at the same time capturing the $CO_2$ and/or $H_2S$ content of the support fuel alongside the $CO_2$ and $H_2S$ from the $CO_2$ enriched stream.

Another option is to use as a support fuel stream: a gaseous stream derived from the production of the gaseous mixture; a portion of the gaseous mixture; a stream separated from the gaseous mixture in addition to the $H_2$/CO product stream and $CO_2$ enriched stream; a portion of the $H_2$/CO product; or a stream derived from the $H_2$/CO product. The use of such streams provides an integrated and, again, economic means of stabilizing combustion, whereby reliance upon an externally sourced and (in particular in the case of traditional types of support fuel) costly means of stabilizing combustion is avoided. Where the support fuel stream is obtained from a stream that would otherwise have represented a waste stream, the use of this waste stream as the support fuel stream may also avoid a need to otherwise further treat this stream, providing further process integration and cost savings.

Referring to FIG. 2, a general method for production of the syngas feed 101 is shown. Sulphur containing feedstock 201 is gasified and then quenched in unit 202 (normally, the gasifier and quenching unit would be separate units, but are in FIG. 2 depicted as a single unit, for simplicity) to produce a crude syngas stream 203 from which the particulates present in the initial crude syngas from gasification have been at least substantially removed. Crude syngas stream 203 is then reacted in a water-gas shift reactor 204, to obtain a shifted syngas stream 205 in which part of the CO previously present in the stream has been converted to $CO_2$ and $H_2O$. Shifted syngas stream 205 then forms the aforementioned crude syngas feed 101 to system 102, which in the embodiment depicted in FIG. 2 consists of a single PSA system 206, which as described above separates the feed to provide $H_2$/CO product stream 103 and $CO_2$ enriched stream 104.

In this arrangement, support fuel stream(s) could be obtained from the production of the sygnas feed 101 at a number of different locations. It could be a stream 210 of the crude syngas produced in unit 202 which is taken prior to the quenching step. It could be a vapour stream 211 obtained as a flash gas from a waste water stream from quenching the crude syngas. It could be a stream 212 of the quenched syngas taken prior to the water-gas shift. It could also be stream 213 of the shifted syngas stream 205, a portion of which would therefore be taken as a support fuel stream rather than being fed to the PSA system 102.

Equally, the support fuel stream could be a stream 214 obtained from system 102, or could be a stream 215 obtained from a portion of the $H_2$/CO product. The support fuel stream 214 taken from system 102 could also be formed in a number of different ways.

One option would be to generate the $H_2$/CO product, $CO_2$ enriched and support fuel streams in a single PSA system 206, whereby the $CO_2$ enriched stream 104 is formed from gases obtained during the blowdown step of the PSA system and the support fuel stream is 214 formed from gases obtained during the purge step of the PSA system, or whereby gases withdrawn at different points in time during the same blowdown and/or purge step(s) of the PSA system are used to produce the $CO_2$ enriched stream 104 and support fuel stream 214.

Another option (not illustrated) would be to use a system 102 that comprises two PSA systems that are operated in parallel and under different process conditions, the syngas feed 101 being split between the two PSA systems. Part of the feed is separated in one PSA system, which employs a higher pressure adsorption step in order to increase the concentration of $H_2$ or $H_2$ and CO in the gases desorbed from the system during blowdown/purge, the support fuel stream being formed from these gases obtained during blowdown and/or purge steps of this system. Another part of the feed is separated in the other PSA system, which uses a lower pressure adsorption step that provides for more optimal separation of $CO_2$ and $H_2S$ from $H_2$ (or $H_2$ and CO), the $CO_2$ enriched stream being formed from the gases obtained during the blowdown and/or purge steps of this system. The $H_2$ (or $H_2$ and CO) enriched streams formed from the gas pushed through the beds of the two systems during their adsorption steps is then recombined to form the $H_2$/CO product stream 103. For example, the system 102 could comprise five PSA units operated in parallel, with the syngas feed 101 being split equally between them, and whereby one unit (constituting the first of the above described PSA systems) is operated to produce the support fuel stream and the other four units (together constituting the second of the above described PSA systems) are operated to produce in combination the $CO_2$ enriched stream 104.

Another option would be to use a PSA system 102 that comprises two PSA systems operated in series, whereby the syngas feed 101 is fed into the first PSA system in the series, which separates the feed to produce an $H_2$ (or $H_2$ and CO) enriched stream and a stream comprising $H_2S$ and $CO_2$, the $H_2$ (or $H_2$ and CO) enriched stream being passed to the second PSA system in the series for further separation into a the $H_2/CO$ product stream 103 and a stream containing $CO_2$. In this arrangement, the $CO_2$ enriched stream may then consist of one of said stream comprising $H_2S$ and $CO_2$ and said stream containing $CO_2$, and the support fuel stream may consist of the other of said streams. Alternatively, the $CO_2$ enriched stream could be formed from one or both of said stream comprising $H_2S$ and $CO_2$ and said stream containing $CO_2$, and the support fuel stream formed from another $H_2$ or $H_2$ and CO enriched stream separated from the gaseous mixture by the first PSA system.

FIGS. 3 and 4, depict two specific arrangements for using two PSA systems in series to separate syngas feed 101 into a $H_2/CO$ product stream 103, $CO_2$ enriched stream 104, and support fuel stream 303/404. Syngas feed 101 is in each case formed in the same manner as in the process depicted in FIG. 2 described above, and the same reference numerals have been used in FIGS. 3 and 4 as in FIG. 2 to denote common features.

Referring to FIG. 3, system 102 in this case comprises two PSA systems, 301 and 302. The first PSA system 301 separates the syngas feed 101 into an $H_2S$ enriched stream 303 and a stream 304 depleted in $H_2S$ and enriched in $H_2$ or $H_2$ and CO. PSA unit 301 comprises adsorbent selective for $H_2S$ over $CO_2$, $H_2$ and CO (and, to a lesser extent $CO_2$ over $H_2$ and CO), and is preferably operated so that the $H_2S$ enriched stream 303 recovers all or at least substantially all the $H_2S$ present in the feed, $H_2S$ enriched stream 303 typically comprising 20 to 80 mole % $H_2S$ (the remainder being, predominantly, $CO_2$). The $H_2S$ depleted stream 304 therefore typically contains no or substantially no $H_2S$. The $H_2S$ depleted stream 304 is then further separated in the second PSA system 302 to provide the $H_2/CO$ product stream 103 and $CO_2$ enriched stream 104 (which in this case, contains no or substantially no $H_2S$). $H_2S$ enriched stream 303 is then taken as support fuel stream 109. In an alternative arrangement, another type of separation system (such as, for example, a liquid solvent system, such as Selexol™, Rectisol®) could also be used in place of PSA unit 301 to separate feed 101 into the $H_2S$ enriched stream 303 and $H_2S$ depleted stream 304.

Referring to FIG. 4, system 102 again comprises two PSA systems, 401 and 402. The first PSA system 401 separates the syngas feed 101 into the $CO_2$ enriched stream 104 (which, in this case, contains also $H_2S$) and an $H_2$ or $H_2$ and CO enriched stream 403. The $H_2$ enriched stream 403 is a relatively high purity $H_2$ stream, having an $H_2$ concentration of at least about 90 mole %, and which therefore constitutes a suitable fuel for combustion in a gas turbine or the like to generate power. The first PSA system 401 may therefore, if desired, produce a second $H_2$ enriched stream 405 of the same composition as stream 403 (streams 403 and 405 being divided from a single stream as shown in FIG. 4 or produced separately from PSA system 401, as desired) which is taken as a fuel stream for generating power. $H_2$ enriched stream 403 is then further separated in the second PSA system 402 to provide the $H_2/CO$ product stream 103 and a stream 404 comprising $CO_2$, $H_2$ (and, optionally, CO). $H_2/CO$ product stream 103 is in this case a high purity $H_2$ stream (e.g. 99.9 mole % $H_2$ or higher) of suitable grade for chemicals production. Stream 404 in this arrangement will contain significant amounts of $H_2$ or $H_2$ and CO, and is therefore taken as the support fuel stream 109.

Example

For this example, the separation of a sour ($H_2S$ containing) crude syngas mixture into an $H_2/CO$ product stream, $CO_2$ enriched stream, and support fuel stream, via the arrangement depicted in FIG. 4, and the subsequent combustion of the support fuel and $CO_2$ enriched streams, were simulated using Aspen process modeling software. The first PSA system 401 in this example comprises 3 identical PSA units, arranged in parallel. Crude syngas stream 203 derived from the gasification of petroleum coke, roughly 6 wt % sulfur, in gasifier 202 is shifted in catalytic water gas shift reactor 204 to produce the crude syngas feed 101 to PSA system 401, which comprises three PSA units. The composition of the syngas feed to each of the three units of PSA system 401 is specified below, in Table 2. The gas pushed through the first and second units of PSA system 401 during the adsorption step produces an $H_2$ enriched stream which is taken as a fuel stream (stream 405) for a gas turbine and is combusted to generate clean power. The compositions of the product stream (gas pushed through during the adsorption step) and tailgas (gas obtained during blowdown and purge) streams from for the first and second units are shown in Table 2. The third unit of PSA system 401 contains the same adsorbent and operated in the same way as the first and second units. The product stream ($H_2$ enriched gas obtained from the adsorption step) and tailgas stream (gas obtained during blowdown and purge) from this third unit are therefore of the same composition as the product and tailgas streams from the first and second units (as, again, shown in Table 2). However, the product stream from the third unit is sent (stream 403) to the second PSA system 402 (composed of a single PSA unit) where it is further separated to produce a high purity $H_2$ product stream (stream 103) and a second tailgas stream. The compositions of the product and tailgas streams from the second PSA system are likewise shown in Table 2. The product gas obtained from the first and second units of the first PSA system is, as noted above, combusted in a gas turbine to generate power. More specifically, a combined cycle is used to produce 814 MWe from the product gas from these units. Approximately 250 MMSCFD (million standard cubic feet per day; corresponding to about 708 thousand standard cubic meters) of high purity $H_2$ is produced as product from the second PSA system.

TABLE 2

| | | | $1^{st}$, $2^{nd}$ and $3^{rd}$ units of $1^{st}$ PSA system | | $2^{rd}$ PSA system | |
|---|---|---|---|---|---|---|
| Quantity | Units | PSA Feed* | Product Stream* | Tailgas Stream* | Product Stream | Tailgas Stream |
| Total Flow | lbmol/hr (kgmol/hr) | 63404 (28760) | 33392 (15146) | 30011 (13613) | 27504 (12476) | 5888 (2671) |
| Composition | Mole fraction | | | | | |
| H2 | | 0.535 | 0.946 | 0.079 | 0.9999 | 0.698 |
| N2 | | 0.008 | 0.002 | 0.002 | — | 0.069 |
| CO | | 0.012 | 0.017 | 0.007 | — | 0.099 |

TABLE 2-continued

| | | | | | | |
|---|---|---|---|---|---|---|
| $CO_2$ | | 0.422 | 0.012 | 0.879 | — | 0.069 |
| $CH_4$ | | 0.001 | 0.001 | 0.001 | — | 0.003 |
| Ar | | 0.007 | 0.011 | 0.002 | 10 ppmv | 0.061 |
| $H_2S$ | | 0.012 | 3 ppm | 0.026 | — | 18 ppmv |
| COS | | 20 ppmv | — | 42 ppmv | — | — |
| $H_2O$ | | 0.002 | 56 ppmv | 0.004 | — | 32 ppmv |
| Higher Heating Value (HHV) | Btu/scf (kJ/scm) | 186 (7010) | 313 (11800) | 45 (1700) | 324 (12210) | 261 (9840) |

| Product | | Power | Units | $H_2$ | Units |
|---|---|---|---|---|---|
| | | 814 | MW | 250 | MMscfd |

*Flow is listed per PSA unit

The tailgas streams from the four PSA are combusted in a combustion chamber to generate heat for useful work and also a raw $CO_2$ stream which can be further purified for storage. The heating value of the tailgas streams from the first, second and third units of the first PSA system is ~45 Btu/scf, and as such cannot be relied upon to be combustible to form a stable flame. The tailgas stream from the second PSA system is higher in HHV quality than the aforementioned tailgas streams and is similar in composition to the tailgases, produced from PSA systems operated in a steam methane reformer (SMR) plant, that are known to be combustible in air using a myriad of conventional burner technologies to form a stable flame. The tailgas from the second PSA system is therefore taken as support fuel stream 404 and combusted, separately from the tailgas from the first PSA system, to form a stable flame to provide a stable ignition source for combustion of the combustible components of the tailgas from the first PSA system (formed from combining the tailgases from the first, second and third units of said system). The tail gas from the first PSA system, constituting $CO_2$ enriched stream 104, is then brought into contact with said flame to combust all or substantially all the combustible components in that stream. Substantially pure oxygen is used as the oxidant for combustion of the tailgas streams. Table 3 outlines the heat flow from the combustion process.

TABLE 3

| Tailgas Source | | $1^{st}$ PSA | $2^{nd}$ PSA | Mixture |
|---|---|---|---|---|
| Unit | | 1, 2, 3 (combined tailgases) | | |
| Flow | lbmol/hr (kgmol/hr) | 90,033 (40,838) | 5,888 (2,671) | 95,921 (43,509) |
| HHV | Btu/scf (kJ/scm) | 45 (1700) | 261 (9840) | 58 (2190) |
| Heat Input | MMBtu/hr (MMkJ/hr) | 1529 (1613) | 584 (616) | 2113 (2229) |
| | % | 72.4% | 27.6% | 100.0% |

The tailgas from the second PSA system (i.e. the support fuel stream) meets the requirements of National Fire Protection Association (NFPA) guidelines for a Class 1 igniter for air firing applications. The heat provided by combusting the support fuel in substantially pure oxygen is enough to raise the adiabatic flame temperature to 5300° F. (2927° C.). Heat released by the combustion of the support fuel stream provides sufficient heat to combust combustible components of the tailgas from the first PSA system tailgas (i.e. the $CO_2$ enriched stream). The total heat released from the combustion of both streams is sufficient to raise the temperature of the combustion products above the auto ignition temperature of all combustible components. Assuming a 5% heat leak or 100,000,000 Btu/hr (105,500,000 kJ/hr) from the combustion system, the temperature of the flue gas mixture (combustion effluent) exiting the combustion chamber was calculated to be 1637° F. (892° C.), several hundred degrees above the auto ignition temperature of $CH_4$, which is the highest auto ignition temperature of the components listed in this example at 1274° F. (690° C.). The heat leak assumed would be typical of a refractory lined vessel.

It will be appreciated that the invention is not restricted to the details described above with reference to the preferred embodiments but that numerous modifications and variations can be made without departing form the spirit or scope of the invention as defined in the following claims.

The invention claimed is:

1. A method of treating a gaseous mixture, comprising $CO_2$, $H_2$, $H_2S$, optionally CO, and optionally one or more additional combustible components, to obtain an $H_2$ or $H_2$ and CO product stream ($H_2$/CO product stream) and a $CO_2$ product stream, the method comprising:

separating the gaseous mixture to provide the $H_2$/CO product stream and a $CO_2$ enriched stream, the $CO_2$ enriched stream containing at least one combustible component selected from $H_2S$, $H_2$, CO and any additional combustible components present in the gaseous mixture;

obtaining a support fuel stream comprising one or more combustible components, wherein said support fuel stream is a gaseous stream derived from the production of the gaseous mixture, is a portion of the gaseous mixture, is separated from the gaseous mixture in addition to the $H_2$/CO product stream and $CO_2$ enriched stream, is a portion of the $H_2$/CO product, or is derived from the $H_2$/CO product;

combusting the support fuel stream, in the presence of sufficient $O_2$ to combust all or substantially all of the combustible component(s) present in said support fuel stream, to form a stable flame to act as the ignition source for combustion of the combustible component(s) present in the $CO_2$ enriched stream;

contacting the $CO_2$ enriched stream, said flame and sufficient $O_2$ to combust all or substantially all of the combustible component(s) present in said $CO_2$ enriched stream and form a combustion effluent comprising $CO_2$ and the combustion product(s) of the combustible component(s) of the support fuel and $CO_2$ enriched streams; and forming the $CO_2$ product stream from said combustion effluent.

2. The method of claim 1, wherein the gaseous mixture comprises from about 10 to about 60 mole % $CO_2$, from about 500 ppm to about 5 mole % $H_2S$ and from about 35 mole % to the remainder of $H_2$ or, if CO is present, of a mixture of $H_2$ and CO.

3. The method of claim 1, wherein the $H_2$/CO product stream is at least about 90 mole % $H_2$ or a mixture of $H_2$ and CO, and contains less than about 50 ppm $H_2S$.

4. The method of claim 1, wherein the $CO_2$ enriched stream is at least about 70 mole % $CO_2$.

5. The method of claim 1, wherein the $CO_2$ enriched stream has a HHV below 3750 kJ/scm (100 Btu/scf), and the support fuel stream has a HHV above 4500 kJ/scm (120 Btu/scf).

6. The method of claim 1, wherein the oxidant stream or streams mixed with the support fuel stream and $CO_2$ enriched stream to supply the $O_2$ for combustion comprise greater than 21 mole % oxygen.

7. The method of claim 1, wherein the oxidant stream or streams mixed with the support fuel stream and $CO_2$ enriched stream to supply the $O_2$ for combustion comprise at least 90 mole % oxygen.

8. The method of claim 1, wherein the support fuel stream comprises and/or the $CO_2$ enriched stream contains $H_2S$, such that the combustion products in the combustion effluent comprise $SO_x$ and $H_2O$, and in order to form the $CO_2$ product stream $SO_x$ and $H_2O$ are removed from the combustion effluent by:
cooling the combustion effluent to condense out water and convert $SO_3$ to sulfuric acid;
maintaining said cooled combustion effluent at elevated pressure(s) in the presence of $O_2$, water and $NO_x$, for a sufficient time to convert $SO_2$ to sulfuric acid and $NO_x$ to nitric acid; and
separating water, sulfuric acid and nitric acid from said cooled combustion effluent.

9. The method of claim 1, wherein the gaseous mixture is a crude syngas mixture formed by gasifying or reforming a carbonaceous feedstock and, optionally: quenching the initially produced syngas mixture to remove particulates; and/or subjecting the initially produced mixture or the quenched mixture to a water-gas shift reaction; and/or removing water from the initially produced, quenched and/or shifted mixture.

10. The method of claim 9, wherein said support fuel stream is a gaseous stream derived from the production of the gaseous mixture, and is formed from: a vapour obtained from a waste water stream from quenching and/or removing water from the syngas mixture; and/or from a portion of the syngas mixture prior to quenching, water-gas shift, and/or removal of water.

11. The method of claim 1, wherein said support fuel stream is a portion of the gaseous mixture taken to form said support fuel stream instead of being separated to provide the $H_2$/CO product and a $CO_2$ enriched streams.

12. The method of claim 1, wherein said support fuel stream is a stream separated from the gaseous mixture in addition to the $H_2$/CO product stream and $CO_2$ enriched stream.

13. The method of claim 12, wherein the gaseous mixture is separated to provide the $H_2$/CO product stream, the $CO_2$ enriched stream and the support fuel stream using one or more pressure swing adsorption (PSA) systems.

14. The method of claim 13, wherein the gaseous mixture is separated in a PSA system to provide the $H_2$/CO product stream, the $CO_2$ enriched stream and the support fuel stream, whereby the $CO_2$ enriched stream is formed from gas withdrawn during a blowdown step and the support fuel stream is formed from gas withdrawn during a purge step.

15. The method of claim 13, wherein the gaseous mixture is separated in a PSA system to provide the $H_2$/CO product stream, the $CO_2$ enriched stream and the support fuel stream, whereby the $CO_2$ enriched stream and support fuel stream are formed from gases withdrawn at different points in time during the same blowdown and/or purge step(s).

16. The method of claim 13, wherein the gaseous mixture is separated using two PSA systems operated in parallel, wherein one PSA system is operated under one set of operating conditions to separate part of the gaseous mixture to provide an $H_2$ enriched stream and the $CO_2$ enriched stream, and another PSA system is operated under a different set of operating conditions to separate another part the gaseous mixture to provide an $H_2$ enriched stream and the support fuel stream, the $H_2$/CO product stream being formed from one or both of said $H_2$ enriched streams.

17. The method of claim 13, wherein the gaseous mixture is separated using two PSA systems operated in series, wherein the gaseous mixture is separated by a first PSA system to provide an $H_2$ or $H_2$ and CO enriched stream and a stream comprising $H_2S$ and $CO_2$, and the $H_2$ or $H_2$ and CO enriched stream is separated in a second PSA system to provide the $H_2$/CO product stream and a stream containing $CO_2$, wherein: the $CO_2$ enriched stream is formed from one of said stream comprising $H_2S$ and $CO_2$ and said stream containing $CO_2$, and the support fuel stream is formed from the other of said streams; or the $CO_2$ enriched stream is formed from one or both of said stream comprising $H_2S$ and $CO_2$ and said stream containing $CO_2$, and the support fuel stream is formed from another $H_2$ or $H_2$ and CO enriched stream separated from the gaseous mixture by the first PSA system.

18. The method of claim 12, wherein the gaseous mixture is separated to provide the $H_2$/CO product stream, the $CO_2$ enriched stream and the support fuel stream by separating the gaseous mixture to provide the support fuel stream, which comprises $H_2S$ and $CO_2$, and a stream depleted in $H_2S$ and enriched in $H_2$ or $H_2$ and CO, and separating said stream depleted in $H_2S$ to provide the $H_2$/CO product stream and the $CO_2$ enriched stream.

19. The method of claim 12, wherein the gaseous mixture is separated to provide the $H_2$/CO product stream, the $CO_2$ enriched stream and the support fuel stream by separating the gaseous mixture to provide the $CO_2$ enriched stream, which comprises $H_2S$ and $CO_2$, and a stream depleted in $H_2S$ and enriched in $H_2$ or $H_2$ and CO, and separating said stream depleted in $H_2S$ to provide the support fuel stream, which comprises $CO_2$, $H_2$ and optionally CO, and the $H_2$/CO product stream.

20. A method of treating a gaseous mixture, comprising $CO_2$, $H_2$, $H_2S$, optionally CO, and optionally one or more additional combustible components, to obtain an $H_2$ or $H_2$ and CO product stream ($H_2$/CO product stream) and a $CO_2$ product stream, the method comprising:
separating the gaseous mixture to provide the $H_2$/CO product stream and a $CO_2$ enriched stream, the $CO_2$ enriched stream containing $H_2S$ and, optionally, one or more other combustible components selected from $H_2$, CO and any additional combustible components present in the gaseous mixture;
obtaining a support fuel stream comprising $H_2S$ and, optionally, one or more other combustible components, wherein the support fuel stream contains at least 50 ppm $H_2S$;
combusting the support fuel stream, in the presence of sufficient $O_2$ to combust all or substantially all of the combustible component(s) present in said support fuel stream, to form a stable flame to act as the ignition source for combustion of the combustible component(s) present in the $CO_2$ enriched stream;

contacting the $CO_2$ enriched stream, said flame and sufficient $O_2$ to combust all or substantially all of the combustible component(s) present in said $CO_2$ enriched stream and form a combustion effluent comprising $CO_2$, $SO_x$, $H_2O$ and any other combustion product(s) of any other combustible component(s) additional to $H_2S$ present in the support fuel and $CO_2$ enriched streams; and removing $SO_x$ and $H_2O$ from the combustion effluent so as to form the $CO_2$ product stream from said combustion effluent.

21. The method of claim 20, wherein $SO_x$ and $H_2O$ are removed from the combustion effluent by:

cooling the combustion effluent to condense out water and convert $SO_3$ to sulfuric acid;

maintaining said cooled combustion effluent at elevated pressure(s) in the presence of $O_2$, water and $NO_x$, for a sufficient time to convert $SO_2$ to sulfuric acid and $NO_x$ to nitric acid; and separating water, sulfuric acid and nitric acid from said cooled combustion effluent.

22. The method of claim 20, wherein the gaseous mixture comprises from about 10 to about 60 mole % $CO_2$, from about 500 ppm to about 5 mole % $H_2S$ and from about 35 mole % to the remainder of $H_2$ or, if CO is present, of a mixture of $H_2$ and CO.

23. The method of claim 20, wherein the $H_2$/CO product stream is at least about 90 mole % $H_2$ or a mixture of $H_2$ and CO, and contains less than about 50 ppm $H_2S$.

24. The method of claim 20, wherein the $CO_2$ enriched stream is at least about 70 mole % $CO_2$.

25. The method of claim 20, wherein the $CO_2$ enriched stream has a HHV below 3800 kJ/scm (100 Btu/scf), and the support fuel stream has a HHV above 4500 kJ/scm (120 Btu/scf).

26. The method of claim 20, wherein the oxidant stream or streams mixed with the support fuel stream and $CO_2$ enriched stream to supply the $O_2$ for combustion comprise greater than 21% oxygen.

27. The method of claim 20, wherein the oxidant stream or streams mixed with the support fuel stream and $CO_2$ enriched stream to supply the $O_2$ for combustion comprise at least 90% oxygen.

* * * * *